United States Patent
Tian

(10) Patent No.: US 12,309,233 B2
(45) Date of Patent: May 20, 2025

(54) CONNECTION METHOD, DEVICE, DISPLAY APPARATUS, TERMINAL APPARATUS AND MEDIUM

(71) Applicants: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

(72) Inventor: Nan Tian, Guangzhou (CN)

(73) Assignees: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

( * ) Notice: Subject to any disclaimer, the term of this patent is extended or adjusted under 35 U.S.C. 154(b) by 80 days.

(21) Appl. No.: 18/074,087

(22) Filed: Dec. 2, 2022

(65) Prior Publication Data
US 2024/0073286 A1 Feb. 29, 2024

Related U.S. Application Data

(63) Continuation of application No. PCT/CN2022/116291, filed on Aug. 31, 2022.

(51) Int. Cl.
*H04L 67/141* (2022.01)
*H04L 67/142* (2022.01)
*H04L 67/148* (2022.01)

(52) U.S. Cl.
CPC .......... *H04L 67/141* (2013.01); *H04L 67/142* (2013.01); *H04L 67/148* (2013.01)

(58) Field of Classification Search
CPC .... H04L 67/141; H04L 67/148; H04L 67/142
(Continued)

(56) References Cited

U.S. PATENT DOCUMENTS

| 2012/0205431 A1* | 8/2012 | Chang ................. H04N 1/32778 235/375 |
| 2012/0287022 A1* | 11/2012 | Queen ................... G09G 5/006 345/2.1 |

(Continued)

FOREIGN PATENT DOCUMENTS

| CN | 103634735 A | 3/2014 | |
| CN | 108848162 A | * 11/2018 | ........... G06F 3/1454 |

(Continued)

*Primary Examiner* — Cheikh T Ndiaye
*Assistant Examiner* — Ayele F Woldemariam
(74) *Attorney, Agent, or Firm* — BAYES PLLC

(57) ABSTRACT

A connection method, device, display apparatus, terminal apparatus and medium, are provided. The method includes: in the non-networkable case, generating a connection code based on connection information, so that a first screen-transmission application of a client terminal parses the connection code to obtain the connection information, and then establishes a connection between the first screen-transmission application and a second screen-transmission application through the connection information; and publishing service information, wherein the service information includes connection code and available connection information indicated by the connection code, so that when the client terminal cannot establish a connection based on the connection information, the client terminal is connected to the server terminal based on the service information.

16 Claims, 10 Drawing Sheets

(58) Field of Classification Search
USPC .......................................................... 709/227
See application file for complete search history.

(56) References Cited

U.S. PATENT DOCUMENTS

| | | | |
|---|---|---|---|
| 2017/0075503 A1* | 3/2017 | Chakra | G06F 3/1454 |
| 2018/0176272 A1* | 6/2018 | Zur | H10K 85/655 |
| 2020/0301647 A1* | 9/2020 | Yoshida | H04L 65/403 |
| 2022/0311858 A1* | 9/2022 | Kanao | H02J 50/90 |

FOREIGN PATENT DOCUMENTS

| | | | | |
|---|---|---|---|---|
| CN | 109376824 A | * | 2/2019 | ....... G06K 19/06037 |
| CN | 111355821 A | | 6/2020 | |
| CN | 111954162 A | * | 11/2020 | .............. H04W 4/06 |

\* cited by examiner

CONNECTION METHOD, DEVICE, DISPLAY APPARATUS, TERMINAL APPARATUS AND MEDIUM

CROSS-REFERENCE TO RELATED APPLICATION

The present application is a continuation of International Application No. PCT/CN2022/116291, filed on Aug. 31, 2022. The entire content of the above-identified application is expressly incorporated herein by reference.

TECHNICAL FIELD

Embodiments of the present disclosure relates to the field of communication technology, in particular to a connection method, device, display apparatus, terminal apparatus and medium.

BACKGROUND

At present, an application connection between a server terminal and a client terminal usually uses a connection code for communication connection. Its corresponding basic principle is: the server terminal uploads information required for connection to the corresponding server so as to acquire the corresponding connection code, and the client terminal submits the connection code to the server so as to acquire the information required for connection corresponding to the connection code issued by the server. On this basis, the server terminal and the client terminal can complete the corresponding communication connection through the information required for the connection.

However, in the process of the above method, there may be a problem that the server terminal or the client terminal cannot access the server because of failing in connection to a network, which leads to failure of corresponding communication connection between the server terminal and the client terminal.

SUMMARY

Embodiments of the present disclosure provides a connection method, device, display apparatus, terminal apparatus and media in order to solve a problem that a communication connection between the server terminal and the client terminal cannot be established because the server terminal or the client terminal cannot access the server, thereby improving a success rate of establishing a communication connection.

One aspect of embodiments of the present disclosure provides a connection method, which is applied to a data transmission system, the data transmission system includes a display apparatus and a terminal apparatus, the terminal apparatus is installed with a first screen-transmission application, and the display apparatus is installed with a second screen-transmission application, the terminal apparatus and the display apparatus perform data transmission through the first screen-transmission application and the second screen-transmission application, and the method includes:

the display apparatus acquires and displays a connection code through the second screen-transmission application, and publishes service information, wherein the service information includes the connection code and available connection information indicated by the connection code; and the terminal apparatus acquires the connection code through the first screen-transmission application, when the terminal apparatus is non-networkable and/or the display apparatus is non-networkable, the terminal apparatus acquires the connection information based on the connection code through the first screen-transmission application, and establishes, through the first screen-transmission application, a connection with the second screen-transmission application based on acquired connection information, so that the terminal apparatus sends required media data to the second screen-transmission application through the first screen-transmission application.

One aspect of embodiments of the present disclosure provides a connection method, which is applied to a second screen-transmission application of server client terminal, and the method includes:

acquiring connection information required for connecting the server terminal;

obtaining a connection code based on the connection information; and publishing service information, wherein the service information includes the connection code, the service information is used to indicate the connection information to a client terminal, so that the client terminal is connected to the server terminal based on the connection information.

Another aspect of embodiments of the present disclosure provides a connection method, which is applied to a first screen-transmission application of a client terminal, and the method includes:

acquiring a connection code, wherein the connection code is determined based on connection information of a server terminal;

when the connection code indicates that the connection code does not include the connection information, acquiring, based on the connection code, connection information indicated by service information published by the server terminal; and establishing a connection with the server terminal based on the connection information.

Another aspect of embodiments of the present disclosure provides a display apparatus, including:

at least one processor; and a memory in communication connection with the at least one processor; wherein the memory stores a computer program that can be executed by the at least one processor, and the computer program is executed by the at least one processor so as to enable the at least one processor to execute a connection method according to any one of embodiments of the present disclosure.

Another aspect of embodiments of the present disclosure provides a terminal apparatus, including:

at least one processor; and a memory in communication connection with the at least one processor; wherein the memory stores a computer program that can be executed by the at least one processor, and the computer program is executed by the at least one processor so as to enable the at least one processor to execute a connection method according to any one of embodiments of the present disclosure.

Another aspect of embodiments of the present disclosure provides a computer-readable storage medium, the computer-readable storage medium stores computer instructions, and the computer instructions are used to enable a processor to implement a connection method according to any one of embodiments of the present disclosure when being executed.

In the technical solution of embodiments of the present disclosure, firstly connection information required for connection to the server terminal is acquired, and then, in the non-networkable case, a connection code is generated based on the connection information, so that the first screen-transmission application of the client terminal parses the connection code to obtain the connection information, and then establishes a connection between the first screen-transmission application and the second screen-transmission application through the connection information, and after the connection is established successfully, required media data is sent to the second screen-transmission application through the first screen-transmission application, and is displayed on the server terminal, and finally, service information is published, wherein the service information includes the connection code and available connection information indicated by the connection code, so that when the first screen-transmission application of the client terminal cannot establish a connection with the second screen-transmission application based on the connection information required for generating the connection code, the first screen-transmission application of the client terminal is connected to the second screen-transmission application of the server terminal based on connection information indicated by the service information, and the required media data is sent to the second screen-transmission application through the first screen-transmission application of the client terminal and is displayed on the server terminal. According to this method, when the server terminal is non-networkable, a connection code can be generated based on the connection information, so that the client terminal parses the connection code to obtain the connection information for connecting the server terminal, and after the connection is successful, the corresponding media data is displayed. Furthermore, the service information including the connection code and the available connection information indicated by the connection code is published, so that when a connection with the server terminal cannot be established based on the connection information required for generating the connection code, the client terminal establishes a connection through the service information, which avoids a problem that a connection between the server terminal and the client terminal cannot be established because the server terminal and/or the client terminal cannot access the server, thereby improving a success rate of establishing a communication connection.

It should be understood that the content described in this part is not intended to identify the key or important features of embodiments of the present disclosure, nor is it intended to limit the scope of the present disclosure. Other features of the present disclosure will be readily understood by the following description.

BRIEF DESCRIPTION OF THE DRAWINGS

In order to describe technical solutions in embodiments of the present disclosure, the drawings required for describing the embodiments will be briefly described hereinafter. The drawings in the following description are only some embodiments of the present disclosure.

DETAILED DESCRIPTION

In order to enable those skilled in the art to better understand the solution of the present disclosure, the technical solution in the embodiments of the present disclosure will be described in combination with the drawings in the embodiments of the present disclosure hereinafter. The described embodiments are only a part of embodiments of the present disclosure, not all thereof. Based on embodiments of the present disclosure, all other embodiments acquired by those skilled in the art without paying creative labor should belong to the claimed scope of the present disclosure.

It should be noted that the terms "first," "second," and the like in the description and claims of the present disclosure and the above drawings are used to distinguish similar objects, and need not be used to describe a specific order or sequence. It should be understood that data thus used can be interchanged where appropriate, so that embodiments of the present disclosure described herein can be implemented in an order other than those illustrated or described herein. In addition, the terms "include," "have," and any variations thereof are intended to cover non-exclusive inclusion. For example, a process, method, system, product or device that contains a series of steps or units need not be limited to those steps or units that are clearly listed, but can include other steps or units that are not clearly listed or are inherent to these processes, methods, products or devices.

Currently, as for interconnecting applications between a server terminal and a client terminal, a common solution is a connection code. Its basic principle is that the server terminal reports information necessary for connection to a server, so as to acquire the connection code, and the client terminal submits the connection code to the server, so as to acquire the information necessary for the above connection issued by the server. On this basis, the connection process between the server terminal and the client terminal is completed by information necessary for connection.

Figure 1:
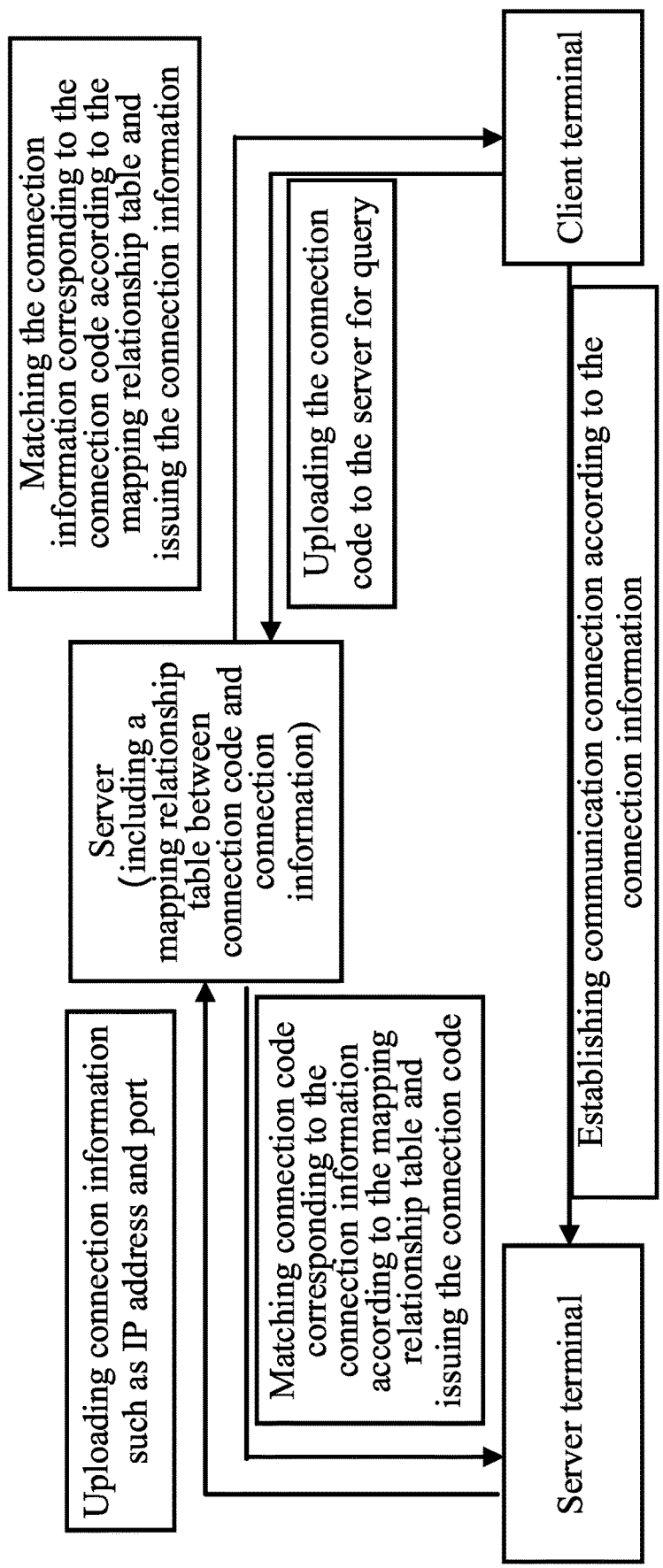
FIG. 1 is a diagram of implementing a connection method provided by an embodiment of the present disclosure.

FIG. 1 is a diagram of implementing a connection method provided by an embodiment of the present disclosure. As shown in FIG. 1, an implementation process of the connection method is as follows: the server terminal uploads connection information such as corresponding Internet Protocol (IP) address and port (which can be considered as the information necessary for connection or information required for connection) to the server; the server includes a mapping relationship table between the connection code and the connection information, wherein the mapping relationship table can be dynamically generated, for example, the server terminal uploads the connection information, the server randomly matches the connection code based on the connection information, and then stores the connection information and its corresponding connection code in the mapping relationship table; the server randomly matches the connection code based on the connection information, and issues the connection code to the server terminal; the client terminal uploads the connection code to the server for query, for example, the connection code of the client terminal can be manually entered by a user; the server obtains the connection information corresponding to the received connection code according to the mapping relationship table and issues the connection information to the client terminal. On this basis, the communication connection between the client terminal and the server terminal can be carried out according to the connection information.

However, in the above connection method, the following situations may exist: the server terminal or the client terminal cannot access the server because they cannot access the network (for example, from a perspective of information security, some or all devices cannot access the Internet, resulting in the server terminal or the client terminal is non-networkable), which leads to the server terminal and the client terminal cannot establish the communication connection.

In this embodiment, the server terminal can be understood as a terminal apparatus that provides corresponding services. Correspondingly, the client terminal can be understood as a terminal apparatus that interacts with the server terminal so as to request corresponding services. For example, the server terminal can be an interactive white board (such as providing functions of reception and display of screen projection), and the client terminal (such as requesting screen projection to the server terminal) can be a smartphone, laptop, etc. The interactive white board can use a high-definition Liquid Crystal Display (LCD) screen as a display and operation platform, and has the functions of writing, annotation, painting, multimedia entertainment, network conference, etc., which integrates many technologies such as human-machine interaction, panel display, multi-media information processing and network transmission.

Embodiment 1

Figure 2:
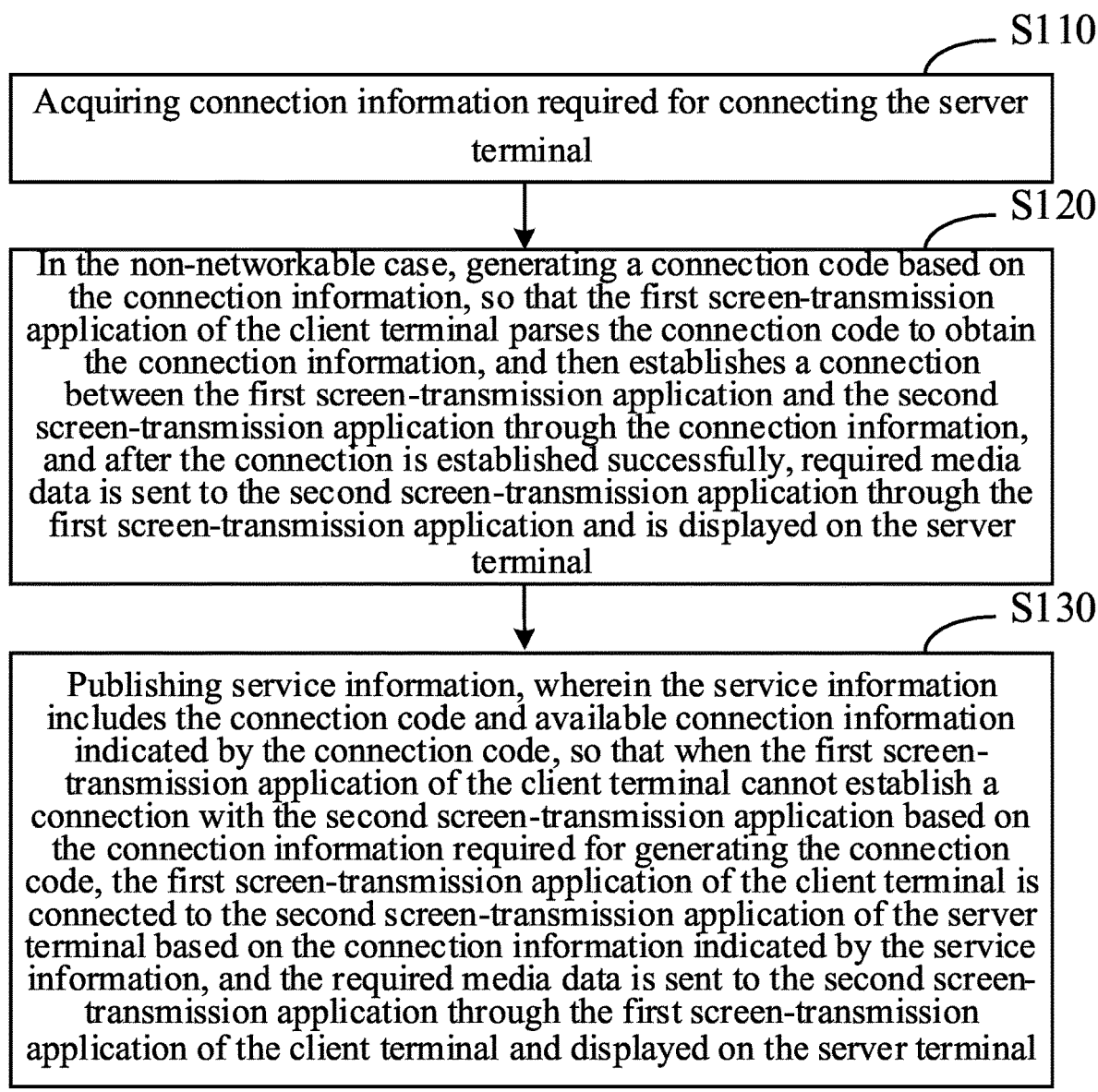
FIG. 2 is a flowchart of a connection method provided in Embodiment 1 of the present disclosure.

FIG. 2 is a flowchart of a connection method provided by Embodiment 1 of the present disclosure. The method can be applied to a second screen-transmission application of the server terminal. The embodiment can be applicable for the communication connection with the first screen-transmission application of the client terminal based on a connection code. The method can be implemented by the connection device, and the connection device can be implemented in the form of hardware and/or software. The connection device can be configured in a display apparatus, and the display apparatus can be a server terminal for providing corresponding services. As shown in FIG. 2, the method includes:

S110, acquiring connection information required for connecting the server terminal.

In this embodiment, the connection information can be understood as the information required for other terminals (such as client terminals) to connect to the server terminal. For example, the connection information can include information such as an IP address and port of the server terminal. There is no specific restriction on how to acquire the connection information required for connecting to the server terminal. For example, it is possible to acquire information such as the IP address and port of the server terminal (that is, the connection information) according to the corresponding configuration information of the server terminal. The configuration information can be information related to connection, such as configuration information related to establishing a connection with the server terminal.

S120, in the non-networkable case, generating a connection code based on the connection information, so that the first screen-transmission application of the client terminal parses the connection code to obtain the connection information, and then establishes the connection between the first screen-transmission application and the second screen-transmission application through the connection information, and after the connection is established successfully, required media data is sent to the second screen-transmission application through the first screen-transmission application and is displayed on the server terminal.

In this embodiment, the connection code can be understood as a string of codes used for the communication connection between the server terminal and the client terminal. The connection code can be composed of a string of numbers and/or letters. The number of connection codes is not limited herein, for example, the number of connection codes is set to at least a plurality, such as at least 5 or 6. The non-networkable case can be understood as that the server terminal cannot access the Internet.

The first screen-transmission application can be understood as an application program on the client terminal side that is used to provide a function of requesting screen projection. The second screen-transmission application can be understood as an application program on the server terminal side that provides functions of reception and display of screen projection. Media data can refer to an important medium for storing and transmitting information. The specific content of the media data is not limited herein. For example, the media data can include audio data, video data, or a combination of the two.

After the server terminal acquires the connection information, when the server terminal is non-networkable, the server terminal can generate a connection code based on the acquired connection information. There is no restriction on how the server terminal generates the connection code based on connection information. IP addresses with different classes (such as a-class address, b-class address and c-class address) can correspond to different generation methods of connection codes. The IP address is encoded with 30-bit (i.e., 30 bits) binary data for exemplary description.

In an embodiment, for a-class address 10.x.x.x (i.e., 10.0.0.0-10.255.255.255), three x is a non-fixed segment, and the corresponding binary address occupies 24 bits (i.e., 8 bit+8 bit+8 bit=24 bit). The highest two bits of 30-bit binary data can be set as 1 and 1 respectively. The binary address corresponding to the non-fixed segment (that is, 24 bits) in a-class address can be filled into any bit of the 30-bit binary data except the highest two bits. On this basis, the remaining bits of the 30-bit binary data can be filled with random numbers. Finally, the filled 30-bit binary data can be converted into the connection code obtained by the server terminal based on a-class address.

In an embodiment, correspondingly, for b-class address 172.16.x-x-172.31.x.x (i.e., 172.16.0.0-172.31.255.255), the address segments corresponding to 16 and 31 and the address segments corresponding to two x are non-fixed segments of b-class address, wherein the binary address of the address segment corresponding to 16 to 31 is 4 bits, so the binary address of the non-fixed segment of b-class address occupies 20 bits (that is, 4 bit+8 bit+8 bit=20 bit). The highest two bits of 30-bit binary data can be set as 1 and 0 respectively. The binary address corresponding to the non-fixed segment (i.e., 20 bits) in b class address can be filled into any bit of the 30-bit binary data except the highest two bits. On this basis, the remaining bits of the 30-bit binary data can be filled with random numbers. Finally, the filled 30-bit binary data can be converted into the connection code obtained by the server terminal based on b-class address.

It should be noted that when the connection code is obtained based on a-class address or b-class address, this embodiment does not limit the setting of the highest two bits of 30-bit binary data. For example, the highest two bits of 30-bit binary data corresponding to a-class address can be 1 and 0 respectively, and the highest two bits of 30-bit binary data corresponding to b-class address are 1 and 1 respectively.

For c-class address, the connection code generated by the server terminal based on c-class address can be a connection code consisting of 6-bit numbers and/or letters. There is no restriction on how the server terminal generates connection codes based on c-class address. An example that the connection code generated by the server terminal based on c-class address is a connection code of 6 digits of pure numbers is taken for description. The connection code generated by the server terminal based on c-class address can be obtained by encoding according to c-class address. In some implementations, 30-bit binary data (that is, 30 bits) are used to encode c-class address, and the highest bit of 30-bit binary data can be filled with zero. The binary address corresponding to a non-fixed segment in c-class address can be filled into other bits in the 30-bit binary data except the highest bit according to a first preset rule. On this basis, the remaining bits in the 30-bit binary data can be filled with random numbers. The first preset rule can be understood as a preset encoding rule, so as to ensure that the connection code encoded by the 30-bit binary data obtained after filling in accordance with the first preset rule is a connection code of 6 digits of pure numbers.

In an embodiment, for a-class address, b-class address and c-class address, when the binary data filled with corresponding data is converted into a connection code, a binary to base-32 conversion function (that is, a conversion function of conversing binary data to base 32 data) can be used to convert the binary data into the connection code of base-32 notation. The connection code can be numbers and/or letters of base-32 notation, which is not limited here.

After generating the connection code, the server terminal can further display the connection code, so that the user of the client terminal views and manually inputs the connection code to the first screen-transmission application of the corresponding client terminal, and thus the first screen-transmission application of the client terminal parses the connection code to obtain the connection information, and then the connection between the first screen-transmission application and the second screen-transmission application is established through the connection information. There is no specific restriction on how the first screen-transmission application parses the connection code.

After the connection between the first screen-transmission application and the second screen-transmission application is successfully established, the required media data can be sent to the second screen-transmission application through the first screen-transmission application, and the media data can be displayed on the server terminal.

In an embodiment, when the server terminal is networkable (that is, the server terminal can access the Internet), the connection information can be transmitted to the corresponding server. The server matches the connection code corresponding to the connection information of the server terminal according to the pre-stored mapping relationship table between connection code and connection information, and issues the connection code of the server terminal to the server terminal. Understandably, a precondition for the server terminal to acquire the connection code of the server terminal from the server is to ensure that the server terminal and the corresponding server can communicate normally on the network. If the server terminal cannot communicate with the server on the network, the server terminal cannot acquire the connection code of the server terminal from the server. When the server terminal is networkable, the server terminal can request the connection code from the server, or generate connection codes locally.

In an embodiment, the server terminal can also generate the connection code of the server terminal locally based on the determined connection information. There is no specific restriction on how the server terminal generates the connection code of the server terminal based on the connection information. For example, it is possible to encode in accordance with a certain rule according to the IP address in the connection information so as to generate the corresponding connection code.

S130, service information is published, wherein the service information includes the connection code and available connection information indicated by the connection code, so that when the first screen-transmission application of the client terminal cannot establish a connection with the second screen-transmission application based on the connection information required for generating the connection code, the first screen-transmission application of the client terminal is connected to the second screen-transmission application of the server terminal based on the connection information indicated by the service information, and the required media data is sent to the second screen-transmission application through the first screen-transmission application of the client terminal and is displayed on the server terminal.

In this embodiment, the service information can be understood as information used to indicate connection information to the client terminal, so that the client terminal connects to the server terminal based on the indicated connection information. For example, the client terminal can connect to the server terminal through the IP address of the server terminal in the connection information. For another example, the client terminal can connect to the server terminal through the IP address and port of the server terminal in the connection information.

When the server terminal is non-networkable, the connection code can indicate available connection information (that is, the connection code can include available connection information). On this basis, the service information can include the connection code and the available connection information indicated by the connection code. The server terminal can publish the service information, so that when the first screen-transmission application of the client terminal cannot establish a connection with the second screen-transmission application based on the connection information required for generating the connection code, the first screen-transmission application of the client terminal is connected to the second screen-transmission application of the server terminal based on the connection information indicated by the service information published by the server terminal, and the required media data is sent to the second screen-transmission application through the first screen-transmission application of the client terminal and is displayed on the server terminal.

This embodiment does not specifically define the manner of publishing service information by the server terminal. For example, the server terminal can publish service information through LAN service discovery technologies (such as User Datagram Protocol (UDP) broadcasting, Simple Service Discovery Protocol (SSDP), and Bonjour). Service information can also be published through near-field communication technologies (such as Bluetooth Beacon, Bluetooth Low Energy (BLE) Beacon, and Wi-Fi Beacon).

This embodiment does not specifically limit the timing when the server terminal publishes service information. For example, the server terminal can publish service information when the network status changes (the network status can include an available network status and an unavailable network status, the server terminal can include multiple networks, and each network can correspond to a network status, the network status change can be a change of the network status of one or more networks thereof, for example, the network status changes to the unavailable status). The service information can further include the network status of each network of the server terminal on the basis of including the connection code information.

For another example, the server terminal can publish service information when the IP address of the server terminal changes. The service information can further include information related to the change of the IP address of the server terminal on the basis of including the connection code information.

Embodiment 1 provides a connection method, firstly, the connection information required for connecting to the server terminal is acquired, and then, in the non-networkable case, the connection code is generated based on the connection information, so that the first screen-transmission application of the client terminal parses the connection code to obtain the connection information, and then establishes a connection between the first screen-transmission application and the second screen-transmission application through the connection information, and after the connection is established successfully, the required media data is sent to the second screen-transmission application through the first screen-transmission application and is displayed on the server terminal, and finally, the service information is published, wherein the service information includes the connection code and available connection information indicated by the connection code, so that when the first screen-transmission application of the client terminal cannot establish a connection with the second screen-transmission application based on connection information required for generating the connection code, the first screen-transmission application of the client terminal is connected to the second screen-transmission application of the server terminal based on the connection information indicated by the service information, and the required media data is sent to the second screen-transmission application through the first screen-transmission application of the client terminal and is displayed on the server terminal. According to this method, when the server terminal is non-networkable, a connection code can be generated based on the connection information, so that the client terminal parses the connection code to obtain the connection information for connecting the server terminal, and after the connection is successful, the corresponding media data is displayed. Furthermore, the service information including the connection code and the available connection information indicated by the connection code is published, so that when a connection with the server terminal cannot be established based on the connection information required for generating the connection code, the client terminal establishes a connection through the service information, which avoids a problem that a connection between the server terminal and the client terminal cannot be established because the server terminal and/or the client terminal cannot access the server, thereby improving the success rate of establishing a communication connection.

Embodiment 2

Figure 3:
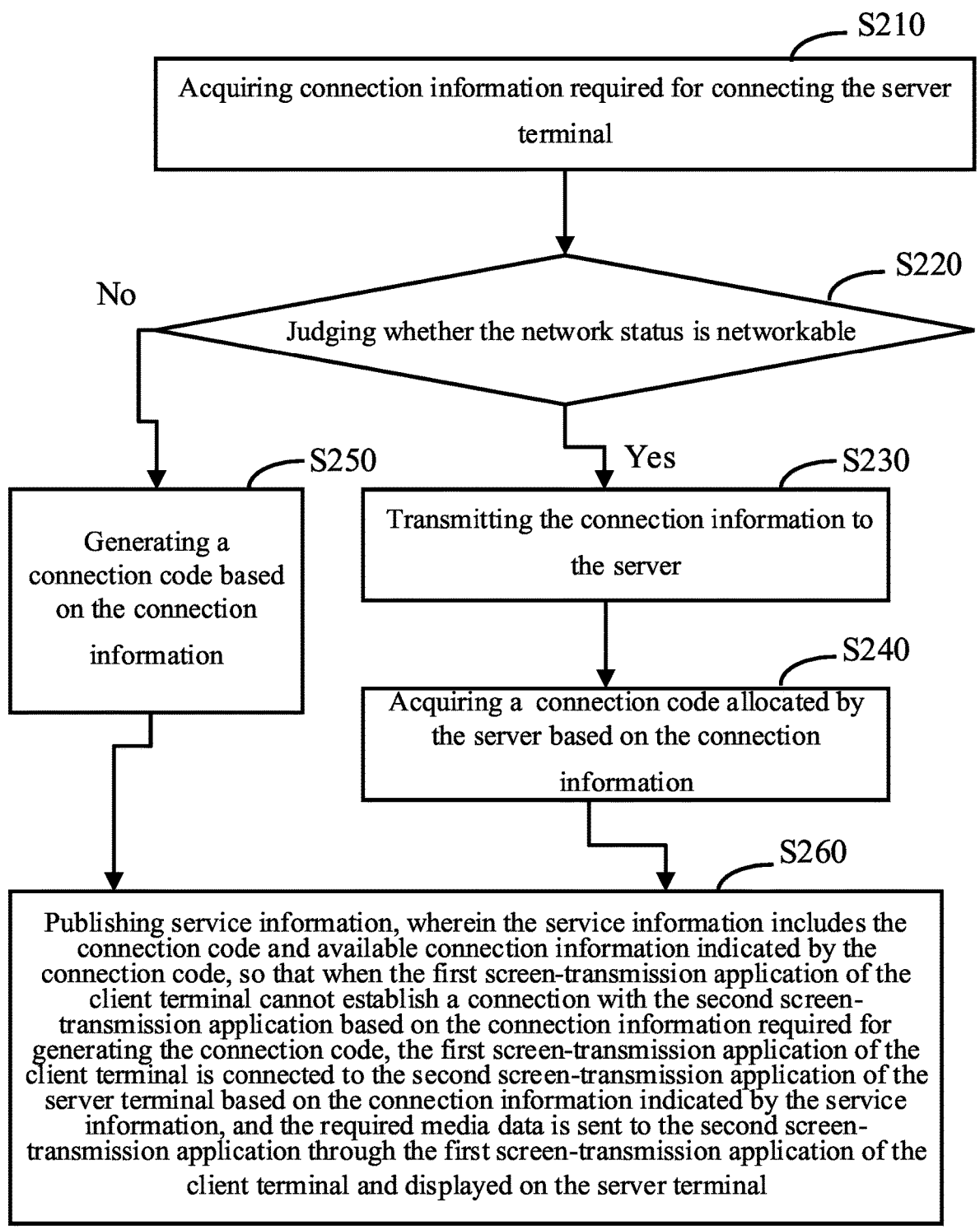
FIG. 3 is a flowchart of a connection method provided in Embodiment 2 of the present disclosure.

FIG. 3 is a flowchart of a connection method provided by Embodiment 2 of the present disclosure, and this embodiment is refined on the basis of the above embodiment. In this embodiment, the process of acquiring the connection code based on the connection information by the server terminal is described in detail. It should be noted that the technical details which is not described in detail in this embodiment can refer to any of the above embodiments. As shown in FIG. 3, this method can be applied to the second screen-transmission application of the server terminal, including:

S210, acquiring connection information required for connecting the server terminal.

In this embodiment, the server terminal can acquire the connection information required for connecting the server terminal according to the corresponding configuration information.

S220, determining whether the network status is networkable. If yes, S230 is executed. If not, S250 is executed.

In this embodiment, the network status can be understood as the status of whether the server terminal can access the Internet. If the server terminal can access the Internet, it can be considered as networkable. If the server terminal cannot access the Internet, it can be considered as non-networkable.

S230, transmitting the connection information to the server.

In this embodiment, if it is determined that the network status of the server terminal is networkable, it indicates that the server terminal can connect with the corresponding server and the server terminal can transmit determined connection information to the server terminal.

S240, acquiring a connection code allocated by the server based on the connection information, and S260 continues to be executed.

In this embodiment, the server can allocate the corresponding connection code based on the connection information of the server terminal. For example, the server can include a preset mapping relationship table between connection code and the connection information. After receiving the connection information transmitted by the server terminal, the server can match the connection code corresponding to the connection information of the server terminal according to the mapping relationship table and issue it to the server terminal, and the server terminal acquires the connection code allocated by the server based on the connection information.

In some implementations, the connection code allocated by the server is different from the connection code generated by the server terminal.

In an embodiment, the highest digit of the binary data corresponding to the connection code allocated by the server based on the connection information may be zero, and the connection code generated by the server may be different from the connection code generated by the server terminal based on c-class address.

In an embodiment, the highest digit of the binary data corresponding to the connection code allocated by the server based on the connection information may be 1, and the connection information generated by the server may be different from the connection code generated by the server terminal.

In an embodiment, when generating the connection code, the server refers to the method of generating the connection code by the server terminal, so as to avoid generating the same connection code as the server terminal. In an embodiment, when generating the connection code, the server may also generate the connection code randomly, and after generation, filter out the connection code generated by the server terminal.

As for the IP address, for example, IP version 4 address (IPv4 address) usually uses 32-bit address (which can be understood as 32-bit binary data). This embodiment can use 30 bits to encode the IP address so as to form corresponding connection code. This embodiment does not limit the number of digits of the connection code (it should be noted that, different from bit, the digit of the connection code refers to a number or a letter, and in the present disclosure, in order to avoid ambiguity, all places representing bit are marked as bit, but the place which is not marked by bit is understood by digit). For example, the connection code can be 6 or 9 digits. This embodiment takes the 6-digit connection code as an example for description. For example, every 5 bits of 30 bits are encoded as a digit of a connection code, and totally, 6 digits of connection codes are encoded.

In this embodiment, the connection code generated by the server terminal based on c-class address can be a connection code composed of 6 digits of number and/or letter. There is no restriction on how the server terminal generates connection codes based on c-class address. An example that the connection code generated by the server terminal based on c-class address is a connection code of 6 digits of pure numbers is taken for description. The connection code generated by the server terminal based on c-class address can be encoded according to c-class address. In some implementations, 30-bit binary data (that is, 30 bits) are used to encode c-class address. The highest bit of 30-bit binary data can be filled with zero. The binary address corresponding to the non-fixed segment in c-class address can be filled into other bits in the 30-bit binary data except the highest bit in according to the first preset rule. On this basis, the remaining bits in the 30-bit binary data can be filled with random numbers. The first preset rule can be understood as a preset coding rule so as to ensure that the connection code encoded by the 30-bit binary data obtained after filling in according to the first preset rule is a connection code of 6 digits of pure numbers.

In a classified network, the high-bit byte of the address can be redefined as class of the network. Therefore, IPv4 addresses can include a-class address, b-class address, and c-class address. Each class of addresses can contain several private addresses that can be used by an intranet. For c-class address 192.168.x.x (192.168.0.0-192.168.255.255), 192 and 168 are fixed address segments, x and x are non-fixed and allocate-able address segments, so they can represent non-fixed segments of c-class address. 192, 168, x and x respectively occupy one byte (i.e., 8 bits) as a memory address, and the memory address occupied by each address segment can be understood as a binary address of the address segment. Therefore, the corresponding binary address of non-fixed segments x and x occupies 16 bits (i.e., bit+8 bit=16 bit).

The connection code included in the mapping relationship table is the connection code generated by the server. There is no specific restriction on connection code generated by the server herein. The connection code generated by the server is different from the connection code generated by the server terminal based on c-class address. It can be understood that the connection code generated by the server does not include the connection code composed of 6 digits of pure numbers.

S250, generating a connection code based on the connection information, and S260 continues to be executed.

In this embodiment, if it is determined that the network status of the server terminal is non-networkable, it indicates that the server terminal cannot be in a network connection with the corresponding server so as to acquire the connection code allocated by the server. At this time, the server terminal can generate the connection code based on the connection information. Reference can be made to the above embodiment for how the server terminal generates the connection code based on the connection information, which will not be described herein.

S260, publishing service information, wherein the service information includes the connection code and available connection information indicated by the connection code, so that when the first screen-transmission application of the client terminal cannot establish a connection with the second screen-transmission application based on the connection information required for generating the connection code, the first screen-transmission application of the client terminal is connected to the second screen-transmission application of the server terminal based on the connection information indicated by the service information, and the required media data is sent to the second screen-transmission application through the first screen-transmission application of the client terminal and is displayed on the server terminal.

Embodiment 2 provides a connection method, which describes the process of acquiring a connection code by the server terminal based on connection information. According to this method, by setting different connection-code determination means of the server terminal under the networkable and non-networkable conditions, this method not only improves the flexibility of determining the connection code, but also avoids the problem that the server terminal fails in communication connection with the client terminal because it cannot acquire the connection code from the server due to non-networkable. Furthermore, by setting the highest bit of the binary data corresponding to the connection code to zero, and making the connection code generated by the server being different from the connection code generated by the server terminal based on c-class address, it is possible to effectively distinguish the connection code generated by the server from the connection code generated by the server terminal based on c-class address, so as to avoid duplication and confusion of the connection code.

In some implementations, the step that generating the connection code based on the connection information includes: determining corresponding class identification information based on a class of IP address in the connection information; determining a binary address corresponding to a non-fixed segment of IP address; and converting binary data formed by the class identification information and the binary address into the connection code.

Therein, the class of IP address can be understood as the class of IP address generated after IP addresses are classified with different network classes. For example, the class of IP address includes a-class address, b-class address and c-class address. Class identification information can be understood as a binary number used to identify the class of IP address. There is no specific restriction on class identification information herein. For example, the number of bits of class identification information can be two. Understandably, in order to distinguish a-class address, b-class address and c-class address, the class identification information corresponding to each class of address is different.

The connection information may include an IP address. The corresponding class identification information can be determined based on the class of IP address in the connection information. There are no restrictions on how to determine the corresponding class identification information based on the class of IP address in the connection information. For example, the class identification information of a-class address can be 1 and 1, the class identification information of b-class address can be 1 and 0, the class identification information of c-class address can be 0 and 0, and/or 0 and 1.

As for determining the binary address corresponding to the non-fixed segment in the IP address, there is no specific restriction on how to determine the binary address corresponding to the non-fixed segment in the IP address, and reference can be made to the above embodiments for details. Understandably, the non-fixed segments corresponding to each class of IP address can be different, and the corresponding binary addresses are also different.

For each class of IP address, the binary data formed by the class identification information and the binary address is converted into the connection code. For example, the IP address can be encoded with 30-bit binary data, and the class identification information and binary address can be filled into the 30-bit binary data. For example, the class identification information can be filled in the highest bit of the 30-bit binary data, and the binary address can be filled in preset position in the 30-bit binary data (for example, it is possible to fill from the lowest bit of the 30-bit binary data), and the remaining bits in the 30-bit binary data can be filled with random numbers. On this basis, the filled binary data (that is, the binary data formed by class identification information and binary address) can be converted into the connection code (that is, the connection code of base-32 notation) through a conversion function of binary to base-32.

In some implementations, the number of bits of the class identification information is two, the class identification information is filled from the highest bit of the binary data, the binary address is at preset position of the binary data, and the connection code is numbers and/or letters of base-32 notation.

Therein, the number of bits of the class identification information is two, and the class identification information can be filled from the highest bits of binary data. For example, if the class identification information is 0 and 1, 0 can be filled in the highest bit of binary data and 1 can be filled in the secondary highest bit of binary data.

The preset position can be understood as a position preset in the binary data for filling in the binary address, which is not limited herein, and can be flexibly set according to actual needs. The binary address can be set at the preset position of the binary data.

The connection code can be numbers and/or letters of base-32 notation. The binary data can be converted into corresponding connection code of base-32 notation through corresponding conversion function (such as a binary to base-32 conversion function).

In some implementations, if the IP address is c-class address, the connection code is pure numbers. If the IP address is a-class address or b-class address, the connection code includes numbers and letters. The highest bit of the class identification information corresponding to a-class address and b-class address is 1, and the highest bit of the class identification information corresponding to c-class address is zero.

Therein, in order to distinguish each class of IP address, the class identification information and connection code corresponding to each class of IP address can be different. In this embodiment, the highest bit of class identification information corresponding to a-class address and b-class address can be 1, and the highest bit of class identification information corresponding to c-class address can be zero. If the IP address is c-class address, the connection code can be pure numbers. If the IP address is a-class address or b-class address, the connection code can include numbers and letters.

In some implementations, the connection code generated by the server terminal is different from the connection code allocated by the server.

In order to avoid confusion with the connection code allocated by the server, the connection code generated by the server terminal may be different from the connection code allocated by the server.

In some implementations, when the connection code is issued by the server or the server terminal has multiple network connections, the service information includes connection information, and the connection information includes one or more IP addresses.

Therein, when the connection code is issued by the server, it is different from the connection code generated by the server terminal itself based on the connection information, the connection code issued by the server does not contain the corresponding connection information. Therefore, the service information published by the server terminal can further include the connection information, so that the client terminal can connect to the server terminal based on the connection information. The connection information can be the IP address corresponding to the server terminal.

When the server terminal has multiple network connections (such as Bluetooth, wired, wireless, etc.), each network connection can correspond to a unique IP address. At this time, the service information published by the server terminal can include the IP addresses corresponding to all network connections, so that the client terminal can acquire the required IP addresses from all IP addresses in the service information.

Embodiment 3

Figure 4:
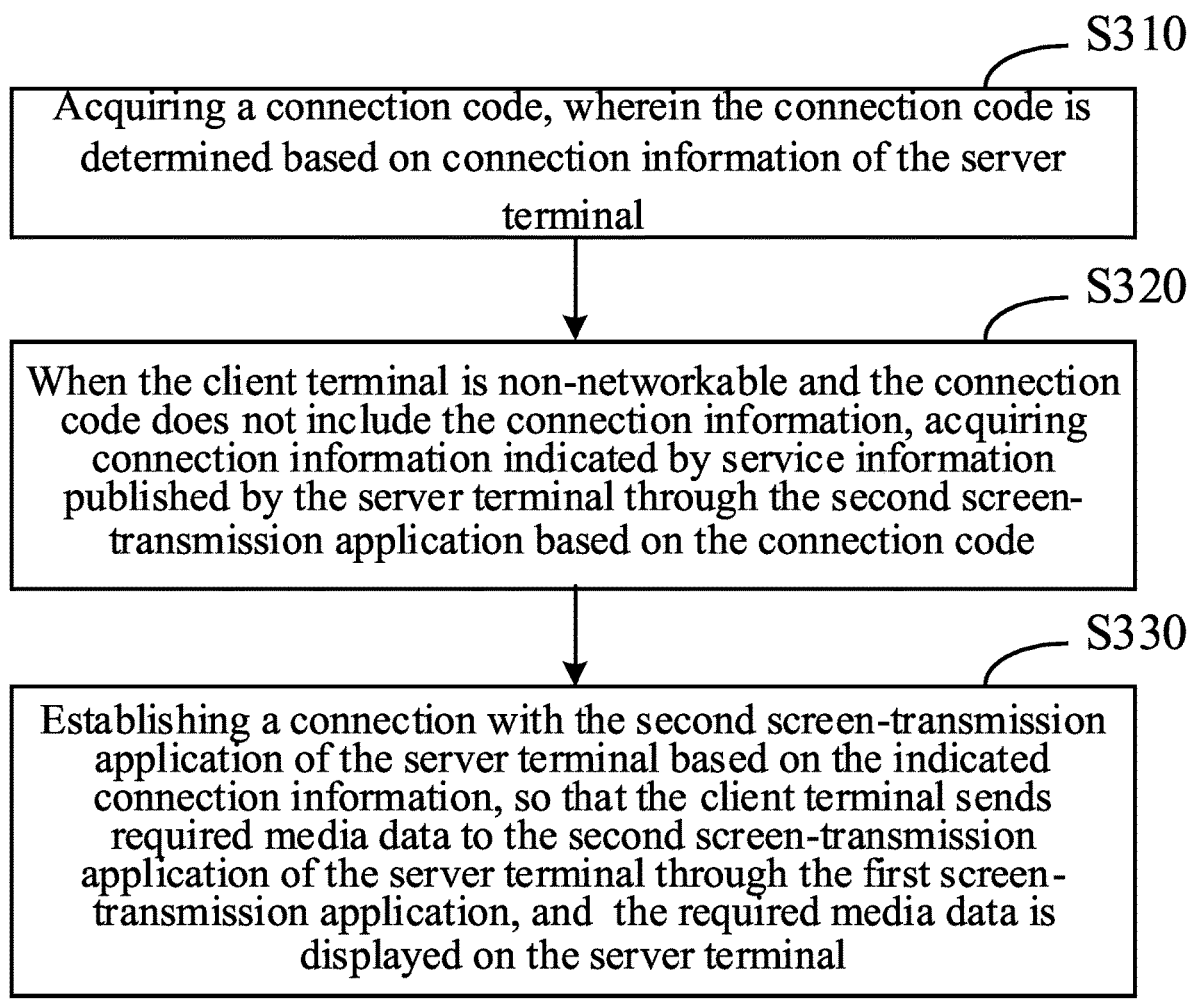
FIG. 4 is a flowchart of a connection method provided in Embodiment 3 of the present disclosure.

FIG. 4 is a flowchart of a connection method provided by Embodiment 3 of the present disclosure. The method can be applied to a first screen-transmission application of a client terminal. The embodiment can be applicable to the communication connection with a second screen-transmission application of a server terminal based on a connection code. The method can be implemented by a connection device, and the connection device can be implemented in the form of hardware and/or software. The connection device can be configured in the terminal apparatus, and the terminal apparatus can be a client terminal that interacts with the server terminal for requesting corresponding services. As shown in FIG. 4, the method includes:

S310, acquiring a connection code, wherein the connection code is determined based on connection information of the server terminal.

In this embodiment, in the process of communication connection with the server terminal, the client terminal can firstly acquire the connection code. There is no restriction on how to acquire the connection code herein. For example, it can be acquired by manual input at the client terminal (for example, the client terminal acquires input connection code through disposed human-machine interaction interface), it can also be acquired through the service information published by the server terminal (for example, the connection code included in the service information acquired by the client terminal through the service information published by the server terminal).

In some implementations, the connection code is input through the human-machine interaction interface.

The connection code may be determined based on the connection information. For example, the server terminal can upload the connection information to the server so as to acquire the connection code issued by the server, and in this case, the connection code does not include the connection information. The connection code may also be a connection code generated by the server terminal based on the connection information, and in this case, the connection code includes the connection information.

S320, when the client terminal is not connected to the network and the connection code does not include the connection information, acquiring the connection information indicated by the service information published by the server terminal through the second screen-transmission application based on the connection code.

In this embodiment, when the client terminal is not connected to the network and the connection code does not include the connection information, (it can be understood that the connection code is the connection code acquired by the server terminal from the server), the connection information indicated by the service information published by the service terminal through the second screen-transmission application can be acquired based on the connection code. Herein, there is no specific restriction on how the client terminal can acquire the connection information indicated by the service information published by the server terminal through the second screen-transmission application based on the connection code. For example, the connection code can be used as a unique identifier to search the service information published by the server terminal corresponding to the connection code through LAN service discovery technology or near-field communication technology, and acquires the indicated connection information in the service information.

In some implementations, the client terminal uses the connection code as the unique identifier to send query information. The query information can be considered as the information used to query the connection information corresponding to the connection code. After receiving the query information, the server terminal can parse the connection code included in the query information. If it is consistent with the connection code of the server terminal, the server terminal may use the connection code as the unique identifier to send the service information, so as to indicate the connection information to the client terminal.

S330, establishing a connection with the second screen-transmission application of the server terminal based on the indicated connection information, so that the client terminal sends required media data to the second screen-transmission application of the server terminal through the first screen-transmission application, and the media data is displayed on the server terminal.

In this embodiment, after acquiring the connection information required for connecting to the server terminal, the client terminal can establish a communication connection with the second screen-transmission application of the server terminal based on the connection information, so that the client terminal can send the required media data to the second screen-transmission application of the server terminal through the first screen-transmission application, and the required media data is displayed on the server terminal.

Embodiment 3 provides a connection method. Firstly, a connection code is acquired, wherein the connection code is determined based on connection information of the server terminal, and then when the client terminal is not connected to the network and the connection code does not include the connection information, connection information indicated by service information published by the server terminal through the second screen-transmission application is acquired based on the connection code, and finally a connection with the second screen-transmission application of the server terminal is established based on the indicated connection information, so that the client terminal sends required media data to the second screen-transmission application of the server terminal through the first screen-transmission application, and the media data is displayed on the server terminal. According to this method, when the client terminal is not connected to the network and the acquired connection code does not contain the connection information, the connection code is used as the unique identifier to acquire the corresponding connection information from the service information published by the server terminal, which can avoid the problem that a communication connection between the server terminal and the client terminal cannot be established because the server terminal or the client terminal cannot be connected to the network and cannot access the server to acquire the connection information, thereby improving the success rate of establishing a communication connection.

In some implementations, the method further includes: when the connection code indicates that the connection code includes connection information, establishing a connection with the second screen-transmission application of the server terminal based on the connection information included in the connection code.

Therein, when the connection code indicates that the connection code includes connection information (it is understood that the connection code is a connection code generated by the server terminal based on the connection information), the communication connection with the server terminal can be established directly based on the connection information included in the connection code. There is no specific restriction on how the connection with the server terminal is established based on the connection information included in the connection code. For example, the server terminal can parse the connection code according to a certain connection code rules so as to obtain the connection information included in the connection code. In some implementations, for example, the connection code can be converted into binary data through corresponding numeration conversion function, the binary address and class identification information corresponding to the non-fixed segment of the IP address of the server terminal can be acquired from preset position of the obtained binary data, and then the IP address can be determined based on the class identification information and the binary address corresponding to the non-fixed segment. The IP address is the connection information. On this basis, the client terminal can establish a communication connection with the server terminal based on the IP address.

In some implementations, the method further includes: when a connection with the second screen-transmission application of the server terminal is not established successfully based on the connection information included in the connection code, using the connection code as an identifier to acquire respective connection information indicated by the service information published by the server terminal through the second screen-transmission application; and attempting to establish a connection with the second screen-transmission application of the server terminal through the respective connection information in turn until the connection is successful.

In this embodiment, when the connection with the second screen-transmission application of the server terminal is not successfully established based on the connection information included in the connection code, the connection code can be used as the identifier to acquire the respective connection information indicated by the service information published by the server terminal through the second screen-transmission application, wherein the connection information can include the IP address of intercommunication between the server terminal and the client terminal (intercommunication can be understood as the successful communication connection between the server terminal and the client terminal). After respective available connection information is acquired, an attempt to establish a connection with the second screen-transmission application of the server terminal through the respective connection information in turn is made until the connection is successful.

In an embodiment, when the server terminal has multiple network connections, the service information published by the server terminal may contain multiple connection information (that is, multiple IP addresses corresponding to these multiple network connections). The service information further includes the connection code, and the connection code can further include the connection information (there may be two cases: one is that the connection information is included in the connection code, and at this time, the service information further includes the connection code; the other is that the connection code is issued by the server, and at this time, the service information further includes the connection code and the corresponding connection information). On this basis, the client terminal determines the connection information in the service information and the connection information included in the connection code (for example, the connection information included in the connection code can be acquired directly from the service information, or the connection information included in the connection code can be acquired by parsing the connection code), traverses the determined connection information in turn and establishes a connection with the server terminal through the connection information, until the connection information that can successfully establish a connection with the server terminal is traversed, so as to complete the connection with the server terminal.

An exemplary description of the present disclosure will be given hereinafter.

On the basis of the above embodiments, the present disclosure designs a connection code solution:

A 6-digits of connection code is used, each digit can be a number or a capital English letter. By a storage solution of enumerating and compressing intranet addresses, an encoding space of the connection code can be used to encode not only all private IP addresses of the intranet, but also more than 500 million non-repeated connection codes for exchanging connection information through the server.

It should be noted that the Chinese character "R (digit)" may be represented as digit, representing a number or letter, and "bit" represents a binary bit. In order to avoid ambiguity, all the following binary bits are marked with bit. Other items without special marks can be understood as digit, a number or a letter.

An IPv4 address is a 32-bit binary number. Each 8-bit is converted into four segments of numbers for representation, wherein there are several private addresses available for intranet in a-class address, b-class address, and c-class address.

For c-class private address (that is, c-class address) 192.168.x.x (that is, 192.168.0.0-192.168.255.255), there are $2^{16}=65,536$ private addresses that can be used in the intranet. A connection code can be encoded with 6-digit of pure numbers, the available encoding space is $10^6=1,000,000$, and the available encoding space can be used to completely encode all c-class addresses. Therein, the highest bit of class identification information corresponding to c-class address is zero.

For a-class private addresses (i.e., a-class addresses) 10.x.x.x (i.e., 10.0.0.0-10.255.255.255) and b-class private addresses (i.e., b-class addresses) 172.16.x.x-172.31.x.x (i.e., 172.16.0.0-172.31.255.255), a connection code can be encoded with 6-digit numbers+letters (by taking 0-9, 10 digits in total, and 22 letters a-v, each digit of the connection code can have 32 changes) can be used. The available encoding space is $32^6$ (6 digits of 32 digit system) or $2^{30}$ (i.e., 30 digits of binary), about 1.07-billion encoding space.

This embodiment can use a 2-bit binary number (that is, class identification information) to represent the class of IP address (that is, the class of IP address): 10-b class (that is, the class identification information of b-class address is 1 and 0), 11-a class (that is, the class identification information of a-class address is 1 and 1), and through a user-defined conversion function of binary to 32 digit system, it is possible to ensure that the 6-digit connection code generated in the conversion process must start with a letter (so as to ensure that no connection code of pure numbers is generated). For example, the IP address can be encoded with 30-bit binary data. The class identification information starts to be filled at the highest bits of 30-bit binary data. The binary address corresponding to the non-fixed segment of the IP address is at a preset position of 30-bit binary data. On this basis, the binary data formed by the class identification information and binary address can be converted into the connection code of the server terminal through conversion function of binary to 32 digit system.

At this time, the encoding space of the available IP address under each class is $2^{28}$-2.6 hundred million, which can completely encode $2^{24}$-0.17 hundred million a-class private addresses and $2^{20}$-1.05 ten thousand b-class private addresses.

For binary segments 00 and 01, there is still 520 million encoding space available for WAN exchange codes. Correspondingly, in the binary segments 00 and 01, the highest bit of 30-bit binary data can be set to 0, and then the connection code including numbers and/or letters can be generated based on the IP address. Among the generated connection codes, the connection codes of pure numbers are connection codes of c-class address, and the remaining connection codes can be used as WAN exchange codes (that is, the connection codes generated by the server).

On the basis of the above embodiments, the present disclosure further provides a connection method of a client terminal and a server terminal, which can solve a problem that communication connection cannot be realized because the client terminal and the server terminal (that is, the sending terminal and the receiving terminal) cannot realized because the client terminal and the server terminal cannot access the Internet at the same time. The specific implementation process is as follows.

1. The server terminal can connect to the Internet (that is, the network status of the server terminal is networkable, and the server terminal can access the server through the Internet), upload the information required for the connection (that is, the connection information) through the Internet, and acquire the connection code allocated by the server based on the connection information. At the same time, the server terminal uses the connection code generated by the server as the unique identifier, publish service information through LAN service discovery technology (such as UDP broadcast, SSDP, Bonjour, etc.) and near-field communication technology (Bluetooth/BLE/Wi-Fi Beacon, etc.). Therein, the service information includes the connection code, and the service information can be used to indicate the connection information to the client terminal, so that the client terminal connects to the server terminal based on the connection information.

1.1 If the client terminal can also connect to the Internet (that is, the client terminal can access the server through the Internet), the client terminal can acquire the information required for connection (that is, connection information) issued by the server through server analysis (that is, the server matches corresponding connection information from the mapping relationship table according to the connection code uploaded by the client terminal), and then connect to the server terminal according to the connection information;

1.2 If the client terminal cannot connect to the Internet (that is, the client terminal cannot access the server), through the LAN service discovery technology and near-field communication technology, the service information published by the server terminal in the LAN or the service information published by the server terminal through the near-field communication technology can be found by using the connection code as the identifier, so as to acquire the information required for connecting to the server terminal (that is, the connection information), and then the connection with the server terminal is completed according to the connection information;

2. If the server terminal cannot connect to the WAN, according to the design solution of the connection code in the above embodiment, a connection code that can be used in the LAN can be generated by directly encoding the IP address (that is, when the network status of the server terminal is non-networkable, the connection code of the server terminal can be generated based on the connection information); and the service information is published through LAN service discovery technology (such as UDP broadcast, S SDP, Bonjour, etc.) and near-field communication technology (Bluetooth/BLE/Wi-Fi Beacon, etc.) so as to ensure the connection success rate in special scenarios.

2.1 The client terminal can directly parse, according to the connection code rules, the connection code to obtain the IP address information required for connection. At this time, the client terminal can directly attempt to use the IP address to complete the connection with the server terminal (that is, if the connection code includes the connection information, a connection with the server terminal can be established based on the connection information included in the connection code).

2.2 There are some special cases, such as the server terminal has multiple network connections (multiple network connections will correspond to multiple IP addresses). The connection code is obtained by encoding based on one IP address, and the IP address used to encode the connection code does not intercommunicate with the client terminal (the reason for the non-intercommunication may be determined based on the network topology or isolation of network topology, which is not limited herein). At this time, the service information published by the server terminal contains multiple connection information (that is, IP addresses of multiple network connections) and connection codes. At this time, more complete connection information (the connection information can include all available IP addresses of the server terminal) in the service information can still be acquired through LAN service discovery technology and near-field communication technology, so as to complete the connection. For example, all IP addresses can be traversed in turn until an IP address that can successfully connect with the server terminal is found for connection. It should be noted that the method described in the part of 2.2 is not limited to the scenarios where the server terminal cannot connect to the WAN, and here is only an exemplary description, which can also be applied to other applicable scenarios (such as the scenarios where the server terminal can connect to the WAN).

Embodiment 4

Figure 5:
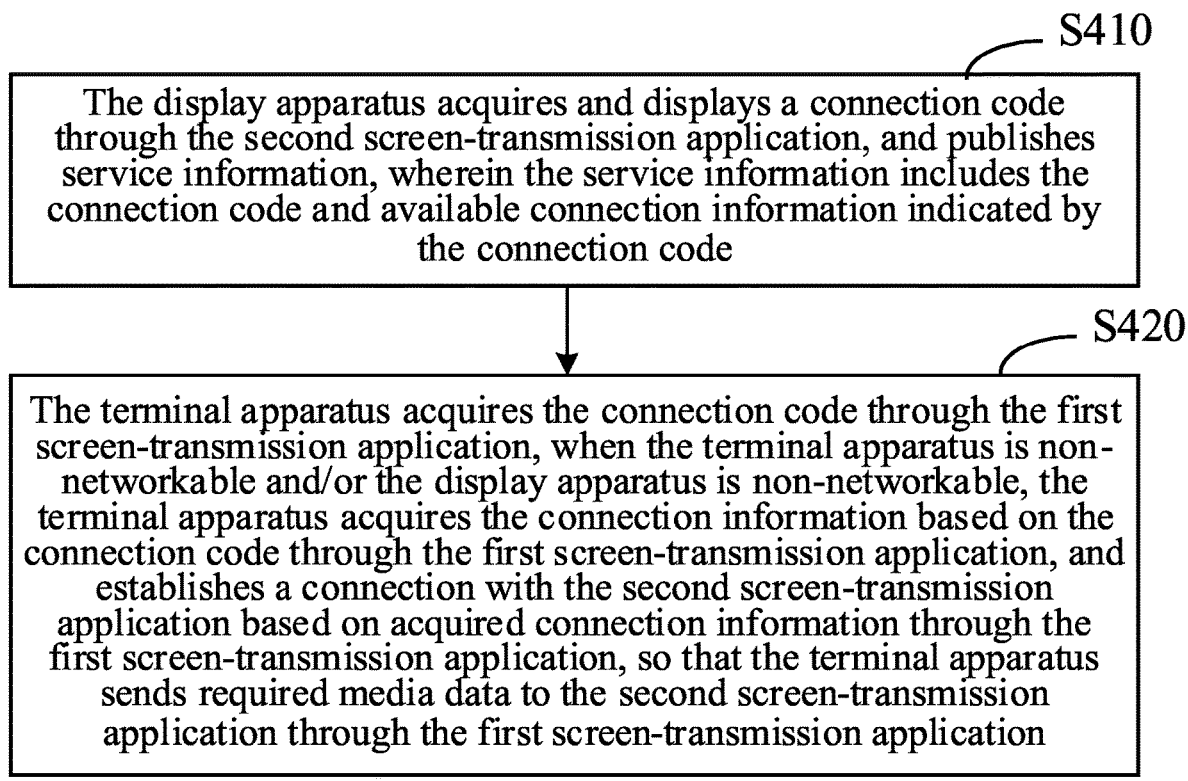
FIG. 5 is a flowchart of a connection method provided in Embodiment 4 of the present disclosure.

FIG. 5 is a flowchart of a connection method provided in Embodiment 4 of the present disclosure. As shown in FIG. 5, this embodiment is applicable to the communication connection between a first screen-transmission application of a client terminal and a second screen-transmission application of a server terminal. The method can be applied to a data transmission system, which can include a display apparatus and a terminal apparatus. The terminal apparatus is installed with the first screen-transmission application, the display apparatus is installed with the second screen-transmission application, and the terminal apparatus and the display apparatus transmit data through the first screen-transmission application and the second screen-transmission application.

As shown in FIG. 5, the method includes:

S410, the display apparatus acquires and displays a connection code through the second screen-transmission application, and publishes service information, wherein the service information includes the connection code and available connection information indicated by the connection code.

In this embodiment, reference is made to the above embodiment for how the display apparatus acquires and displays the connection code through the second screen-transmission application and publishes service information, which will not be described herein.

S420, the terminal apparatus acquires the connection code through the first screen-transmission application, and when the terminal apparatus is non-networkable and/or the display apparatus is non-networkable, the terminal apparatus acquires the connection information based on the connection code through the first screen-transmission application, and establishes a connection with the second screen-transmission application based on acquired connection information through the first screen-transmission application, so that the terminal apparatus sends required media data to the second screen-transmission application through the first screen-transmission application.

In an embodiment, when the client terminal is non-networkable and the server terminal is networkable, the server terminal publishes service information, the service information includes a connection code, and the connection code does not include connection information (that is, the connection code is randomly allocated by the server and does not include connection information (that is, IP address information)). The client terminal acquires connection information indicated by the service information based on the connection code, and establishes a connection with the server terminal based on the connection information.

In an embodiment, when the client terminal is non-networkable and the terminal server is non-networkable, the server terminal publishes service information, the service information includes a connection code, and the connection code includes connection information (that is, the connection code is generated based on connection information). The client terminal can obtain the connection information by parsing the connection code in the service information, and establish a connection with the server terminal based on the connection information. If the connection is not established successfully (for example, it is possible that the server terminal is connected to multiple networks at the same time, such as Network A and Network B, and the connection code is generated only based on the IP address of one of the networks, that is, Network A, but the client terminal is connected to Network B, so even if the IP address of Network A is parsed, the connection cannot be established), and at this time, the connection code can be used as an identifier to acquire all the connection information included in the service information (that is, all the IP addresses indicated by the connection code), so as to attempt to establish a connection one by one until the connection is successful.

Embodiment 4 provides a connection method, in which the display apparatus acquires and displays a connection code through the second screen-transmission application, and publishes service information, wherein the service information includes the connection code and available connection information indicated by the connection code; the terminal apparatus acquires the connection code through the first screen-transmission application, and when the terminal apparatus is non-networkable and/or the display apparatus is non-networkable, the terminal apparatus acquires, through the first screen-transmission application, the connection information based on the connection code, and establishes, through the first screen-transmission application, a connection with the second screen-transmission application based on acquired connection information, so that the terminal apparatus sends required media data to the second screen-transmission application through the first screen-transmission application. According to this method, the connection code is acquired and displayed by the display apparatus through the second screen-transmission application, and the service information is published, the service information includes the connection code and available connection information indicated by the connection code, the terminal apparatus acquires the connection code, and when the terminal apparatus is non-networkable and/or the display apparatus is non-networkable, the terminal apparatus acquires the connection information based on the connection code through the first screen-transmission application so as to establish the connection. Therefore, the method can avoid a problem that a connection between the server terminal and the client terminal cannot be established because the server terminal and/or client terminal cannot access the server, thereby improving the success rate of establishing a communication connection.

In some implementations, when the terminal apparatus is non-networkable and the display apparatus is networkable,
the step that the display apparatus acquires the connection code through the second screen-transmission application includes: the display apparatus transmits the connection information to the server through the second screen-transmission application, and the display apparatus acquires the connection code allocated by the server based on the connection information through the second screen-transmission application;
the step that the first screen-transmission application of the terminal apparatus acquires the connection information based on the connection code includes: the first screen-transmission application of the terminal apparatus acquires the connection code, and uses the connection code as an identifier to acquire the connection information indicated in the service information published by the display apparatus.

In this embodiment, when the terminal apparatus is non-networkable and the display apparatus is networkable, the display apparatus can transmit the connection information to the server through the second screen-transmission application, the server can randomly allocate the connection code to the display apparatus based on the connection information, and the display apparatus can acquire the connection code allocated by the server based on the connection information through the second screen-transmission application. The display apparatus publishes the service information, and the service information includes the connection code and connection information.

When the terminal apparatus is non-networkable and the display apparatus is networkable, the first screen-transmission application of the terminal apparatus acquires the connection code, uses the connection code as the identifier to acquire the connection information indicated in the service information published by the display apparatus, so as to establish a connection with the display apparatus based on the connection information.

In some implementations, when the display apparatus is non-networkable,
the step that the display apparatus acquires the connection code through the second screen-transmission application includes: the display apparatus generates a connection code based on the connection information required for connection through the second screen-transmission application;
the step that the first screen-transmission application of the terminal apparatus acquires the connection information based on the connection code includes: the first screen-transmission application of the terminal apparatus acquires and parses the connection code to obtain the connection information required for generating the connection code.

In this embodiment, when the display apparatus is non-networkable (at this time, the terminal apparatus can be networked or not), the display apparatus cannot acquire the connection code from the server. At this time, the connection code can be generated based on the connection information required for connection through the second screen-transmission application. The display apparatus publishes the service information, and the service information includes the connection code and the available connection information indicated by the connection code.

When the display apparatus is non-networkable (at this time, the terminal apparatus can be networked or not networked), the first screen-transmission application of the terminal apparatus can acquire and parse the connection code in the service information, and obtain the connection information used for generating the connection code. On this basis, a connection with the display apparatus can be established based on the connection information.

In some implementations, the step that the first screen-transmission application of the terminal apparatus acquires the connection information based on the connection code further includes: when the first screen-transmission application cannot establish a connection with the second screen-transmission application based on the connection information obtained by parsing, the connection code is used as an identifier to acquire the connection information indicated in the service information published by the display apparatus.

In this embodiment, when the display apparatus is non-networkable (at this time, the terminal apparatus can be networked or not), if the first screen-transmission application cannot establish a connection with the second screen-transmission application based on the connection information obtained by parsing the connection code, the first screen-transmission application uses the connection code as an identifier to acquire the connection information indicated in the service information published by the display apparatus, so as to establish a connection with the second screen-transmission application based on the connection information.

Embodiment 5

Figure 6:
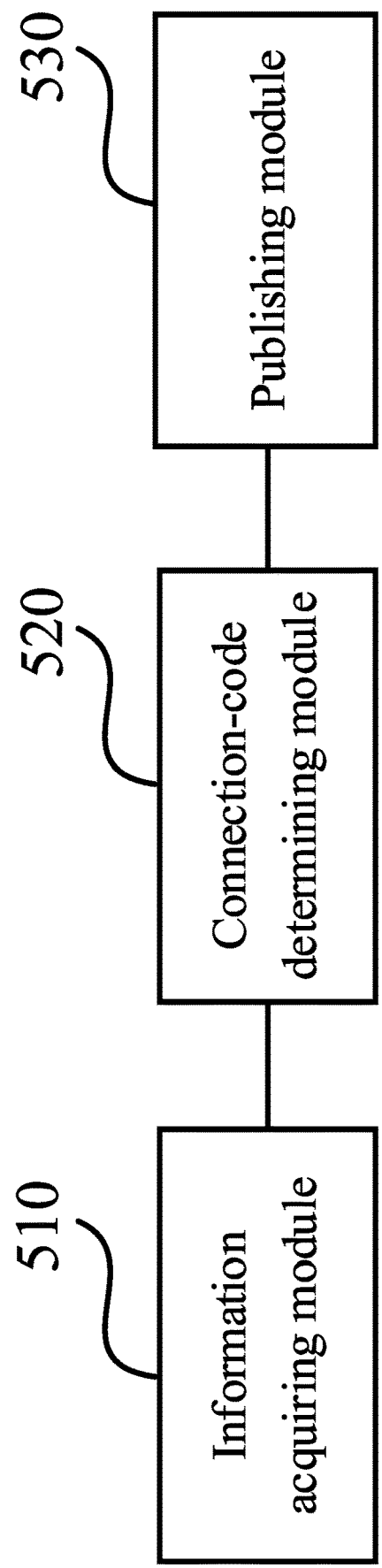
FIG. 6 is a structure diagram of a connection device provided in Embodiment 5 of the present disclosure.

FIG. 6 is a structure diagram of a connection device provided in Embodiment 5 of the present disclosure. As shown in FIG. 6, the device can be configured on the display apparatus, and the device includes:

- an information acquiring module 510, configured to acquire connection information required for connecting the server terminal;
- a connection-code determining module 520, configured to, in the non-networkable case, generate a connection code based on the connection information, so that the first screen-transmission application of the client terminal parses the connection code to obtain the connection information, and then establishes the connection between the first screen-transmission application and the second screen-transmission application through the connection information, after the connection is established successfully, required media data is sent to the second screen-transmission application through the first screen-transmission application and is displayed on the server terminal; and
- a publishing module 530, configured to publish service information, wherein the service information includes the connection code and available connection information indicated by the connection code, so that when the first screen-transmission application of the client terminal cannot establish a connection with the second screen-transmission application based on the connection information required for generating the connection code, the first screen-transmission application of the client terminal is connected to the second screen-transmission application of the server terminal based on the connection information indicated by the service information, and required media data is sent to the second screen-transmission application through the first screen-transmission application of the client terminal and is displayed on the server terminal.

This device firstly acquires connection information required for connecting the server terminal, and then, in the non-networkable case, generates a connection code based on the connection information, so that the first screen-transmission application of the client terminal parses the connection code to obtain the connection information, and then establishes the connection between the first screen-transmission application and the second screen-transmission application through the connection information, and after the connection is established successfully, required media data is sent to the second screen-transmission application through the first screen-transmission application and is displayed on the server terminal, and finally, publishes the service information, wherein the service information includes the connection code and available connection information indicated by the connection code, so that when the first screen-transmission application of the client terminal cannot establish a connection with the second screen-transmission application based on the connection information required for generating the connection code, the first screen-transmission application of the client terminal is connected to the second screen-transmission application of the server terminal based on the connection information indicated by the service information, and the required media data is sent to the second screen-transmission application through the first screen-transmission application of the client terminal and is displayed on the server terminal. According to this device, when the server terminal is non-networkable, a connection code can be generated based on the connection information, so that the client terminal parses the connection code to obtain the connection information for connecting the server terminal, and after the connection is successful, the corresponding media data is displayed. Furthermore, the service information including the connection code and the available connection information indicated by the connection code is published, so that when a connection with the server terminal cannot be establishes based on the connection information required for generating the connection code, the client terminal establishes a connection through the service information, which avoids a problem that a connection between the server terminal and the client terminal cannot be established because the server terminal and/or the client terminal cannot access the server, thereby improving the success rate of establishing a communication connection.

In some implementations, the connection code generated by the server terminal is different from the connection code allocated by the server.

In some implementations, the device further includes:
- a transmitting module, configured to, in the non-networkable case, transmit the connection information to the server; and
- a connection-code acquiring module, configured to acquire the connection code allocated by the server based on the connection information.

In some implementations, the connection-code determining module 520 includes:
- an information determining unit, configured to determine corresponding class identification information based on a class of Internet Protocol address in the connection information;
- an address determining unit, configured to determine a binary address corresponding to a non-fixed segment of the Internet Protocol address; and
- a converting unit, configured to convert binary data formed by the class identification information and the binary address into the connection code.

In some implementations, the number of bits of the class identification information is two, the class identification information starts to fill in the highest bit of the binary data, the binary address is at a preset position of the binary data, and the connection code is numbers and/or letters of base-32 notation.

In some implementations, when Internet Protocol address is c-class address, the connection code is pure numbers, and when Internet Protocol address is a-class address or b-class address, the connection code includes numbers and letters. The highest bit of the class identification information corresponding to a-class address and b-class address is 1, and the highest bit of the class identification information corresponding to c-class address is zero.

The connection device provided by the embodiment of the present disclosure can execute the connection method provided by any embodiment of the present disclosure, and has the corresponding functional modules and beneficial effects of executing the method.

Embodiment 6

Figure 7:
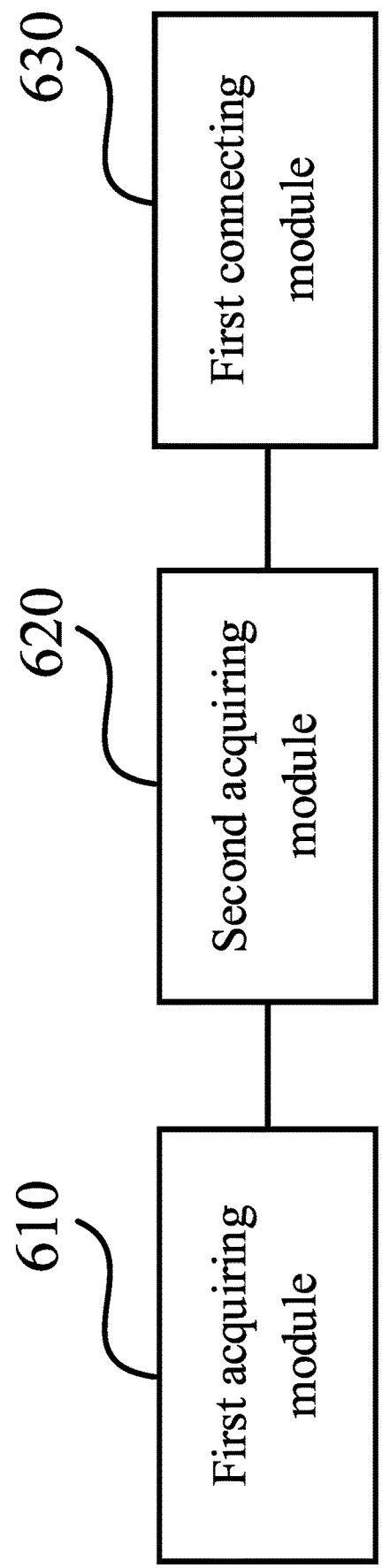
FIG. 7 is a structure diagram of a connection device provided in Embodiment 6 of the present disclosure.

FIG. 7 is a structure diagram of a connection device provided in Embodiment 6 of the present disclosure. As shown in FIG. 7, the device can be configured on a terminal apparatus, and the device includes:
- a first acquiring module 610, configured to acquire a connection code, wherein the connection code is determined based on connection information of a server terminal;
- a second acquiring module 620, configured to, when the client terminal is not connected to the network and the connection code does not include the connection information, acquire connection information indicated by service information published by the server terminal through a second screen-transmission application based on the connection code; and
- a first connecting module 630, configured to establish a connection with the second screen-transmission application of the server terminal based on the indicated connection information, so that the client terminal sends required media data to the second screen-transmission application of the server terminal through a first screen-transmission application, and the media data is displayed on the server terminal.

This device firstly acquires a connection code, wherein the connection code is determined based on connection information of the server terminal, and then when the client terminal is not connected to the network and the connection code does not include the connection information, acquires connection information indicated by service information published by the server terminal through the second screen-transmission application based on the connection code, and finally establishes a connection with the second screen-transmission application of the server terminal based on the indicated connection information, so that the client terminal sends required media data to the second screen-transmission application of the server terminal through the first screen-transmission application, and the media data is displayed on the server terminal. According to this device, when the client terminal is not connected to the network and the acquired connection code does not contain the connection information, the connection code is used as the unique identifier to acquire the corresponding connection information from the service information published by the server terminal, which can avoid the problem that the server terminal cannot establish a communication connection with the client terminal because the server terminal or the client terminal is non-networkable and cannot access the server to obtain the connection information, thereby improving the success rate of establishing a communication connection.

In some implementations, the device further includes:

A second connection module, configured to, when the connection code indicates that the connection code includes the connection information, establish a connection with the second screen-transmission application of the server terminal based on the connection information included in the connection code.

In some implementations, the connection code is input through a human-machine interaction interface.

In some implementations, the device further includes:
- a third acquiring module, configured to, when a connection with the second screen-transmission application of the server terminal is not established successfully based on the connection information included in the connection code, use the connection code as an identifier to acquire respective connection information indicated by the service information published by the server terminal through the second screen-transmission application; and
- a third connecting module, configured to attempt to establish a connection with the second screen-transmission application of the server terminal through the respective connection information in turn until the connection is successful.

The connection device provided by the embodiment of the present disclosure can execute the connection method provided by any embodiment of the present disclosure, and has the corresponding functional modules and beneficial effects of executing the method.

Embodiment 7

Figure 8:
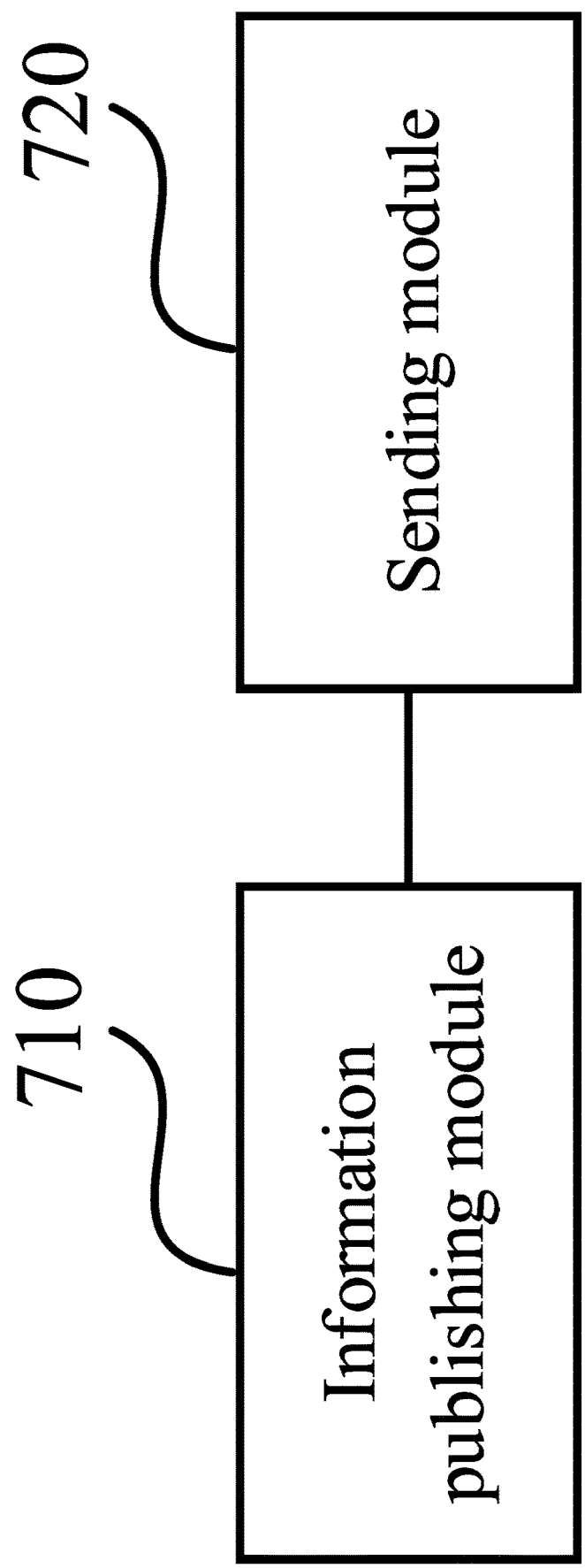
FIG. 8 is a structure diagram of a connection device provided in Embodiment 7 of the present disclosure.

FIG. 8 is a structure diagram of a connection device provided in Embodiment 7 of the present disclosure. As shown in FIG. 8, the device can be applied to a data transmission system, and the device includes:
- an information publishing module 710, configured that the display apparatus acquires and displays a connection code through the second screen-transmission application, and publishes service information, wherein the service information includes the connection code and available connection information indicated by the connection code; and
- a sending module 720, configured that the terminal apparatus acquires the connection code through the first screen-transmission application, when the terminal apparatus is non-networkable and/or the display apparatus is non-networkable, the terminal apparatus acquires the connection information based on the connection code through the first screen-transmission application, and establishes, through the first screen-transmission application, a connection with the second screen-transmission application based on the acquired connection information, so that the terminal apparatus sends required media data to the second screen-transmission application through the first screen-transmission application.

In this embodiment, through the information publishing module 710, the display apparatus acquires and displays a connection code through the second screen-transmission application, and publishes service information, wherein the service information includes the connection code and available connection information indicated by the connection code. Through the sending module 720, the terminal apparatus acquires the connection code through the first screen-transmission application, when the terminal apparatus is non-networkable and/or the display apparatus is non-networkable, the terminal apparatus acquires, through the first screen-transmission application, the connection information based on the connection code, and establishes, through the first screen-transmission application, a connection with the second screen-transmission application based on the acquired connection information, so that the terminal apparatus sends required media data to the second screen-transmission application through the first screen-transmission application. According to this device, the display apparatus can acquire and display the connection code through the second screen-transmission application, and publish the service information that includes the connection code and available connection information indicated by the connection code, the terminal apparatus can acquire the connection code, and when the terminal apparatus is non-networkable and/or the display apparatus is non-networkable, the terminal apparatus can acquire the connection information based on the connection code through the first screen-transmission application so as to establish the connection. This device can avoid the problem that a connection between the server terminal and the client terminal cannot be established because the server terminal and/or client terminal cannot access the server, thereby improving the success rate of establishing a communication connection.

In some implementations, when the terminal apparatus is non-networkable and the display apparatus is networkable, the terminal apparatus acquiring the connection code through the second screen-transmission application includes:

the display apparatus transmits the connection information to the server through the second screen-transmission application, and the display apparatus acquires the connection code allocated by the server based on the connection information through the second screen-transmission application;

the first screen-transmission application of the terminal apparatus acquiring the connection information based on the connection code includes:

the first screen-transmission application of the terminal apparatus acquires the connection code, and uses the connection code as an identifier to acquire the connection information indicated in the service information published by the display apparatus.

In some implementations, when the terminal apparatus is non-networkable, the display apparatus acquiring the connection code through the second screen-transmission application includes:

the display apparatus generates, through the second screen-transmission application, the connection code based on the connection information required for connection;

the first screen-transmission application of the terminal apparatus acquiring the connection information based on the connection code includes:

the first screen-transmission application of the terminal apparatus acquires and parses the connection code to obtain the connection information required for generating the connection code.

In some implementations, the first screen-transmission application of the terminal apparatus acquiring the connection information based on the connection code further includes: when the first screen-transmission application cannot establish a connection with the second screen-transmission application based on connection information obtained by parsing, the connection code is used as an identifier to acquire the connection information indicated in the service information published by the display apparatus.

The connection device provided by the embodiment of the present disclosure can execute the connection method provided by any embodiment of the present disclosure, and has the corresponding functional modules and beneficial effects of executing the method.

Embodiment 8

Figure 9:
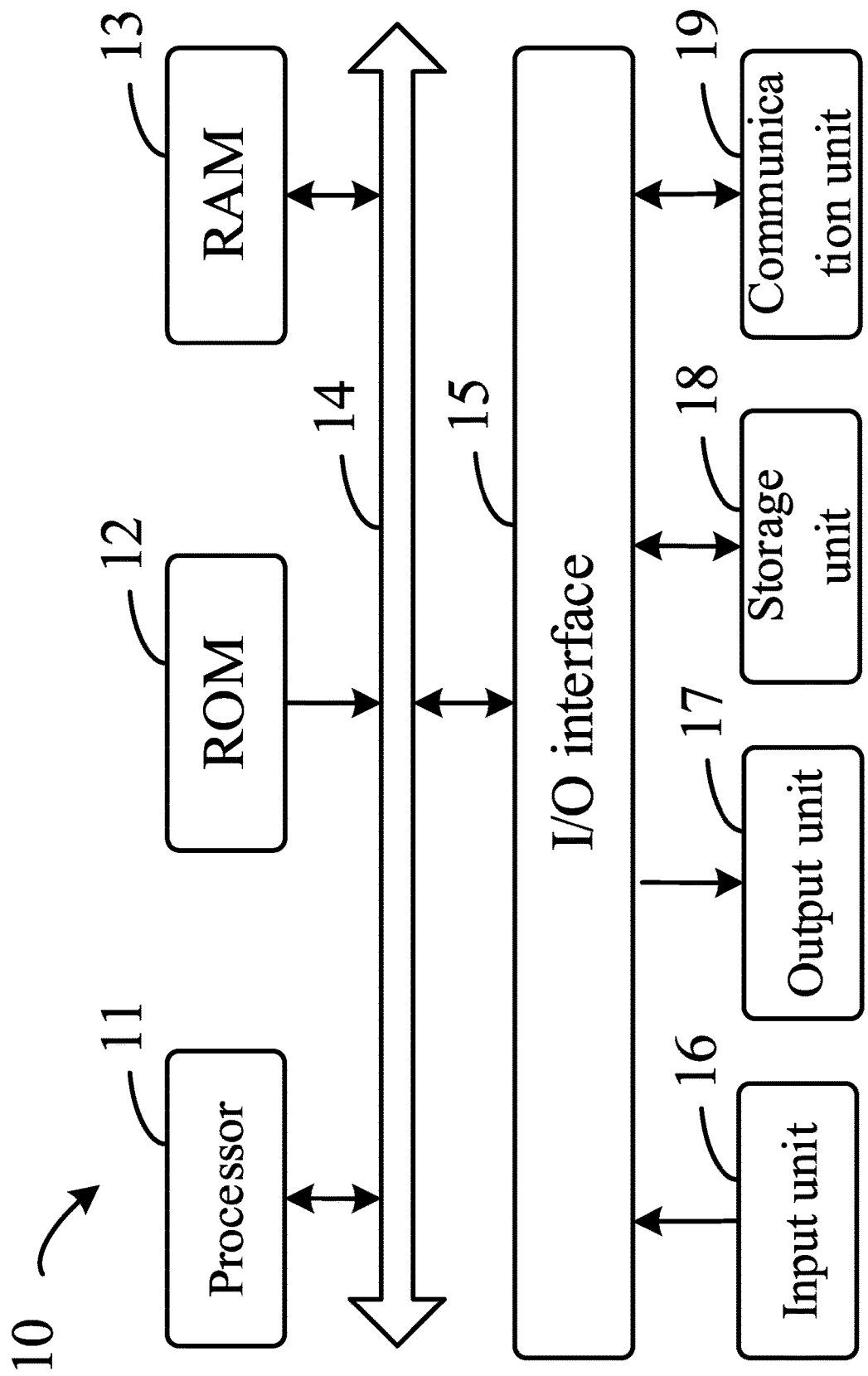
FIG. 9 is a structure diagram of a display apparatus provided in Embodiment 8 of the present disclosure.

FIG. 9 is a structure diagram of a display apparatus provided in Embodiment 8 of the present disclosure. The display apparatus can be considered as a device corresponding to the server terminal provided by the embodiment of the present disclosure. For example, the display apparatus can be an interactive white board. The components, their connections and relationships, and their functions shown herein are only examples, and are not intended to limit the implementation of the present disclosure described herein and/or required herein.

As shown in FIG. 9, the display apparatus 10 includes at least one processor 11 and a memory in communication connection with at least one processor 11, such as a Read-Only Memory (ROM) 12, a Random Access Memory (RAM) 13, etc., wherein the memory stores a computer program that can be executed by at least one processor. The processor 11 may perform various appropriate operations and processes according to a computer program stored in the ROM 12 or a computer program loaded from a storage unit 18 into the RAM 13. RAM 13 can also store various programs and data required for the operation of the display apparatus 10. The processor 11, ROM 12 and RAM 13 are connected to each other via a bus 14. The Input/Output (I/O) interface 15 is also connected to the bus 14.

A plurality of components in the display apparatus 10 which are connected to the I/O interface 15, includes: an input unit 16, such as a camera, a microphone, etc.; an output unit 17, such as a loudspeaker, etc.; the storage unit 18, such as a disk, optical disc, etc.; and a communication unit 19, such as a network card, a modem, a wireless communication transceiver, etc. The communication unit 19 allows the display apparatus 10 to exchange information/data with other devices through a computer network such as the Internet and/or various telecommunication networks.

The processor 11 may be a variety of general and/or special processing components with processing and computing capabilities. Some examples of the processor 11 include, but are not limited to, a Central Processing Unit (CPU), a Graphics Processing Unit (GPU), various specialized Artificial Intelligence (AI) computing chips, various processors running machine learning model algorithms, a Digital Signal Processor (DSP), and any suitable processors, controllers, microcontrollers, etc. The processor 11 performs various methods and processes described above, such as connection methods.

In some embodiments, the connection method may be implemented as a computer program, which is tangibly included in a computer-readable storage medium, such as the storage unit 18. In some embodiments, a part or all of the computer programs can be loaded and/or installed on the display apparatus 10 via ROM 12 and/or the communication unit 19. When a computer program is loaded into RAM 13 and executed by the processor 11, one or more steps of the connection method described above may be performed. In some implementations, the processor 11 may be configured to perform a connection method by any other suitable means (e.g., by means of firmware).

Various embodiments of the systems and technologies described above herein may be implemented in a digital electronic circuit system, an integrated circuit system, a Field Programmable Gate Array (FPGA), an Application Specific Integrated Circuit (ASIC), an Application Specific Standard Product (ASSP), a System On Chip (SOC), a Complex Programmable Logic Device (CPLD), computer hardware, firmware, software, and/or combinations thereof. These various implementation approaches can include: implementing with one or more computer programs, wherein the one or more computer programs can be executed and/or interpreted on a programmable system including at least one programmable processor, the programmable processor can be a special or general programmable processor, and can receive data and instructions from a storage system, at least one input device, and at least one output device, and transmit data and instructions to the storage system, the at least one input device, and the at least one output device.

A computer program for implementing the method of the present disclosure may be written in one programming language or any combination of several programming languages. These computer programs may be provided to a processor of a general computer, a special computer, or other programmable data processing device, such that when the computer programs are executed by the processor, the functions/operations specified in the flowcharts and/or block diagrams are implemented. Computer programs can be executed completely on the machine, partially on the machine, partially on the machine as separate software packages and partially on remote machines, or completely on remote machines or servers.

Embodiment 9

Figure 10:
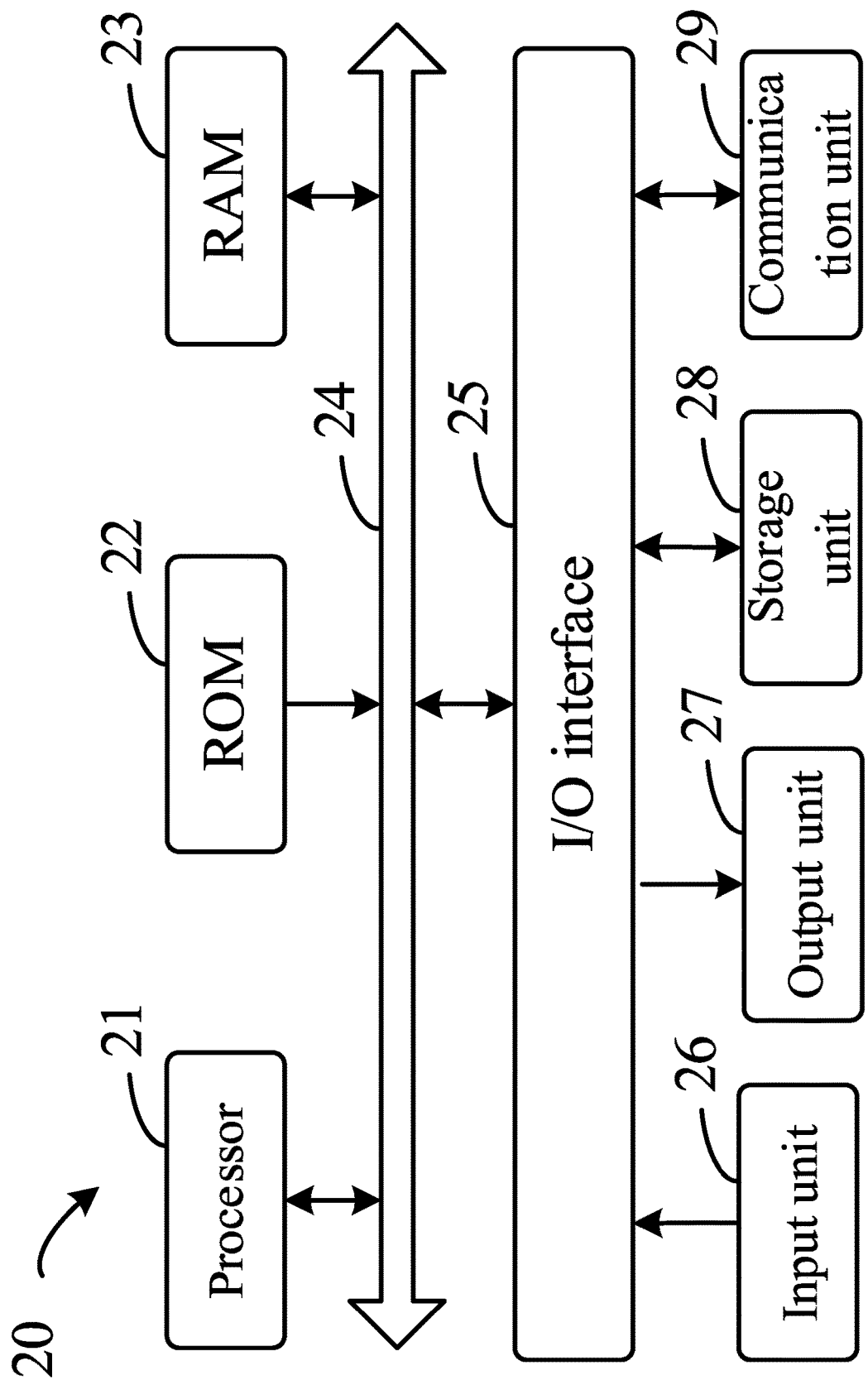
FIG. 10 is a structure diagram of a terminal apparatus provided in Embodiment 9 of the present disclosure.

FIG. 10 is a structure diagram of a terminal apparatus provided by Embodiment 9 of the present disclosure. The terminal apparatus can be considered as a terminal apparatus corresponding to the client terminal provided by the embodiment of the present disclosure. Terminal apparatuses are intended to represent various forms of digital computers, such as laptops, desktops, workstations, personal digital assistants, servers, blade servers, mainframe computers, and other suitable computers. Terminal apparatuses can also represent various forms of mobile devices, such as personal digital processing, cellular phones, smart phones, wearable devices (such as helmets, glasses, watches, etc.), and other similar computing devices. The components, their connections and relationships, and their functions shown herein are only examples, and are not intended to limit the implementation of the present disclosure described herein and/or required herein.

As shown in FIG. 10, the terminal apparatus 20 includes at least one processor 21 and a memory in communication connection with at least one processor 21, such as a ROM 22, a RAM 23, etc., wherein the memory stores a computer program that can be executed by at least one processor. The processor 21 may perform various appropriate operations and processes according to a computer program stored in the ROM 22 or a computer program loaded into the RAM 23 from a storage unit 28. RAM 23 can also store various programs and data required for the operation of the terminal apparatus 20. The processor 21, ROM 22 and RAM 23 are connected to each other via a bus 24. The I/O interface 25 is also connected to the bus 24.

A plurality of components in the terminal apparatus 20 are connected to the I/O interface 25, which includes: an input unit 26, such as a keyboard, a mouse, etc.; an output unit 27, such as various types of displays, speakers, etc.; the storage unit 28, such as a disk, optical disc, etc.; and a communication unit 29, such as a network card, a modem, a wireless communication transceiver, etc. The communication unit 29 allows the terminal apparatus 20 to exchange information/data with other devices through a computer network such as the internet and/or various telecommunication networks.

The processor 21 may be a variety of general and/or special processing components with processing and computing capabilities. Some examples of the processor 21 include, but are not limited to, a CPU, a GPU, various specialized AI computing chips, various processors running machine learning model algorithms, a DSP, and any suitable processors, controllers, microcontrollers, etc. The processor 21 performs various methods and processes described above, such as connection methods.

In some embodiments, the connection method may be implemented as a computer program, which is tangibly included in a computer-readable storage medium, such as the storage unit 28. In some embodiments, a part or all of the computer programs can be loaded and/or installed on the terminal apparatus 20 via ROM 22 and/or the communication unit 29. When a computer program is loaded into RAM 23 and executed by the processor 21, one or more steps of the connection method described above may be performed. Alternatively, in other embodiments, the processor 21 may be configured to perform a connection method by any other suitable means (e.g., by means of firmware).

Various embodiments of the systems and technologies described above herein may be implemented in a digital electronic circuit system, an integrated circuit system, a FPGA, an ASIC, an ASSP, a SOC, a CPLD, computer hardware, firmware, software, and/or combinations thereof. These various embodiments can include: implementing with one or more computer programs, wherein the one or more computer programs can be executed and/or interpreted on a programmable system including at least one programmable processor, the programmable processor can be a special or general programmable processor, and can receive data and instructions from a storage system, at least one input device, and at least one output device, and transmit data and instructions to the storage system, the at least one input device, and the at least one output device.

A computer program for implementing the method of the present disclosure may be written in one programming language or any combination of several programming languages. These computer programs may be provided to a processor of a general computer, a special computer, or other programmable data processing device, such that when the computer programs are executed by the processor, the functions/operations specified in the flowcharts and/or block diagrams are implemented. Computer programs can be executed completely on the machine, partially on the machine, partially on the machine as separate software packages and partially on remote machines, or completely on remote machines or servers.

In the context of the present disclosure, a computer-readable storage medium may be a tangible medium, which may contain or store computer programs for being used by or in combination with an instruction execution system, device or equipment to use. Computer-readable storage media may include, but are not limited to, electronic, magnetic, optical, electromagnetic, infrared, or semiconductor systems, devices, or equipment, or any suitable combination of the foregoing. Alternatively, the computer-readable storage medium may be a machine-readable signal medium. A more specific example of the machine-readable storage medium would include an electrical connection based on one or more lines, a portable computer disk, a hard disk, a RAM, a ROM, an Erasable Programmable Read-Only Memory (EPROM) or flash memory, an optical fiber, a portable Compact Disk Read-Only Memory (CD-ROM), an optical storage device, a magnetic storage device, or any suitable combination of the above.

In order to provide interaction with the user, the system and technology described herein can be implemented on a terminal apparatus, which has: a display apparatus (such as a Cathode Ray Tube (CRT) or LCD monitor) for displaying information to the user; and a keyboard and a pointing device (for example, a mouse or a trackball). Through the keyboard and the pointing device, a user can provide input to the terminal apparatus. Other types of devices can also be used to provide interaction with users. For example, the feedback provided to the user may be any form of sensor feedback (for example, visual feedback, auditory feedback, or tactile feedback), and the input from the user can be received in any form (including sound input, voice input or tactile input).

The systems and technologies described herein may be implemented in a computing system including background components (for example, a data server), or a computing system including middleware components (for example, an application server), or a computing system including front-end components (for example, a user computer with a graphical user interface or a web browser, and through the graphical user interface or the web browser, the user can interact with the implementation approach of the system and technology described herein), or a computing system including any combination of such background components, middleware components, or front-end components. The components of the system may be interconnected by digital data communication (e.g., a communication network) in any form or medium. Examples of communication networks include a Local Area Network (LAN), a Wide Area Network (WAN), a blockchain network, and the Internet.

The computing system may include a client terminal and a server. The client terminal and the server are generally far away from each other and usually interact through the communication network. A relationship of a client terminal and a server is generated by a computer program running on a corresponding computer and having a client terminal-server relationship with each other. The server can be Cloud Service, also known as Cloud Computing Server or Cloud Virtual Machine, and is a host product in the cloud computing service system, so as to solve the problems of difficult management and weak business scalability in traditional physical hosts and VPS services.

It should be understood that various forms of processes shown above can be used to reorder, add or delete steps. For example, the steps recorded in the present disclosure can be executed in parallel, in sequence, or in different order. As long as the desired result of the technical solution of the present disclosure can be achieved, there is no limitation herein.

The above specific implementation approaches do not constitute a limitation on the claimed scope of the present disclosure. Those skilled in the art should understand that various modifications, combinations, sub-combinations and substitutions can be made according to design requirements and other factors. Any modification, equivalent replacement and improvement made within the spirit and principles of the present disclosure shall be included in the claimed scope of the present disclosure.

What is claimed is:

1. A connection method, applied to a data transmission system, wherein the data transmission system comprises a display apparatus and a client terminal, the client terminal is installed with a first screen-transmission application, the display apparatus is installed with a second screen-transmission application, the client terminal and the display apparatus is configured to perform data transmission through the first screen-transmission application and the second screen-transmission application, and the method comprises:

acquiring and displaying, by the display apparatus, a connection code through the second screen-transmission application, and publishing service information, wherein the service information comprises the connection code, available connection information indicated by the connection code, and available connection information indicated by the service information;

acquiring, by the client terminal, the connection code through the first screen-transmission application;

sending media data to the second screen transmission application through the first screen transmission application; and displaying the media data on the display apparatus, wherein acquiring, by the display apparatus, the connection code through the second screen-transmission application comprises:

determining whether the display apparatus is networkable, wherein the display apparatus is networkable when the display apparatus has access to the Internet, and the display apparatus is non-networkable when the display apparatus does not have access to the Internet;

in response to determining that the display apparatus is networkable, transmitting, by the display apparatus, the connection information to a server through the second screen-transmission application, and acquiring, by the display apparatus, through the second screen-transmission application, a connection code allocated by the server, wherein the connection code allocated by the server based on the connection information does not include the connection information; and in response to determining that the display apparatus is non-networkable, generating, by the display apparatus, through the second screen-transmission application, a connection code, wherein the connection code generated by the display apparatus includes the connection information.

2. The method according to claim 1, wherein, when the client terminal is non-networkable and the display apparatus is networkable, acquiring, by the client terminal, the connection information based on the connection code through the first screen-transmission application comprises:

acquiring the connection code by the first screen-transmission application of the client terminal, and using the connection code as an identifier to acquire connection information indicated in the service information published by the display apparatus.

3. The method according to claim 1, wherein acquiring, by the first screen-transmission application of the client terminal, the connection information based on the connection code comprises:

acquiring and parsing, by the first screen-transmission application of the client terminal, the connection code to obtain connection information required for generating the connection code.

4. The method according to claim 3, wherein acquiring, by the first screen-transmission application of the client terminal, the connection information based on the connection code further comprises:

when the first screen-transmission application does not establish a connection with the second screen-transmission application based on connection information obtained by parsing, using, by the first screen-transmission application, the connection code as an identifier to acquire the connection information indicated in the service information published by the display apparatus.

5. A connection method, applied to a second screen-transmission application of a display apparatus, the method comprising:
- acquiring, by the display apparatus, the connection code through the second screen-transmission application, wherein acquiring, by the display apparatus, the connection code through the second screen-transmission application comprises:
- determining whether the display apparatus is networkable, wherein the display apparatus is networkable when the display apparatus has access to the Internet, and the display apparatus is non-networkable when the display apparatus does not have access to the Internet;
- in response to the display apparatus is non-networkable, generating a connection code, so that a first screen-transmission application of a client terminal parses the connection code to obtain the connection information, and establishes a connection between the first screen-transmission application and the second screen-transmission application with the connection information, wherein the connection code generated by the display apparatus includes the connection information; and
- in response to the display apparatus is networkable, transmitting, by the display apparatus, the connection information to a server through the second screen-transmission application, and acquiring, by the display apparatus, through the second screen-transmission application, a connection code allocated by the server, wherein the connection code allocated by the server based on the connection information does not include the connection information;
- publishing service information, wherein the service information comprises the connection code allocated by the server, the connection code generated by the display apparatus, available connection information indicated by the connection code generated by the display apparatus, and available connection information indicated by the service information; and
- receiving media data through the first screen transmission application of the client terminal and displaying the media data on the display apparatus.

6. The method according to claim 5, further comprising:
when the first screen-transmission application of the client terminal does not establish a connection with the second screen-transmission application the connection code generated by the display apparatus, connecting the first screen-transmission application of the client terminal to the second screen-transmission application of the display apparatus based on connection information indicated by the service information.

7. The method according to claim 5, wherein generating the connection code comprises:
- determining corresponding class identification information based on a class of Internet Protocol (IP) address in the connection information;
- determining a binary address corresponding to a non-fixed segment in the IP address; and
- converting binary data formed by the class identification information and the binary address into the connection code.

8. The method according to claim 7, wherein the number of bits of the class identification information is two, the class identification information is filled from the highest bit of the binary data, the binary address is at a preset position of the binary data, and the connection code is numbers or letters of base-32 notation.

9. The method according to claim 8, wherein
when the IP address is c-class address, the connection code is pure numbers,
when the Internet Protocol address is a-class address or b-class address, the connection code comprises numbers and letters, and
wherein the highest bit of the class identification information corresponding to a-class address and b-class address is 1, and the highest bit of the class identification information corresponding to c-class address is zero.

10. The method according to claim 5, wherein the connection code generated by the display apparatus is different from the connection code allocated by the server.

11. A display apparatus, comprising:
- a memory storing computer-readable instructions; and
- a processor coupled to the memory and configured to execute the computer-readable instructions, wherein the computer-readable instructions, when executed by the processor, cause the processor to perform operations comprising:
- acquiring, by the display apparatus, the connection code through the second screen-transmission application of the display apparatus, wherein acquiring, by the display apparatus, the connection code through the second screen-transmission application comprises:
- determining whether the display apparatus is networkable, wherein the display apparatus is networkable when the display apparatus has access to the Internet, and the display apparatus is non-networkable when the display apparatus does not have access to the Internet;
- in response to the display apparatus is non-networkable, generating a connection code, so that a first screen-transmission application of a client terminal parses the connection code to obtain the connection information, and establishes a connection between the first screen-transmission application and the second screen-transmission application with the connection information, wherein the connection code generated by the display apparatus includes the connection information; and
- in response to the display apparatus is networkable, transmitting, by the display apparatus, the connection information to a server through the second screen-transmission application, and acquiring, by the display apparatus, through the second screen-transmission application, a connection code allocated by the server, wherein the connection code allocated by the server based on the connection information does not include the connection information;
- publishing service information, wherein the service information comprises the connection code allocated by the server, the connection code generated by the display apparatus, available connection information indicated by the connection code generated by the display apparatus, or available connection information indicated by the service information; and
- receiving media data through the first screen transmission application of the client terminal and displaying the media data on the display apparatus.

12. The display apparatus according to claim 11, wherein the operations further comprise:
when the first screen-transmission application of the client terminal does not establish a connection with the second screen-transmission application the connection code generated by the display apparatus, connecting the first screen-transmission application of the client terminal to the second screen-transmission application of the display apparatus based on connection information indicated by the service information.

13. The display apparatus according to claim 11, wherein generating the connection code based on the connection information comprises:
   determining corresponding class identification information based on a class of Internet Protocol (IP) address in the connection information;
   determining a binary address corresponding to a non-fixed segment in the IP address; and
   converting binary data formed by the class identification information and the binary address into the connection code.

14. The display apparatus according to claim 13, wherein the number of bits of the class identification information is two, the class identification information is filled from the highest bit of the binary data, the binary address is at a preset position of the binary data, and the connection code is numbers or letters of base-32 notation.

15. The display apparatus according to claim 14, wherein
   when the IP address is c-class address, the connection code is pure numbers,
   when the IP address is a-class address or b-class address, the connection code comprises numbers and letters, and
   wherein the highest bit of the class identification information corresponding to a-class address and b-class address is 1, and the highest bit of the class identification information corresponding to c-class address is zero.

16. The display apparatus according to claim 11, wherein the connection code generated by the display apparatus is different from the connection code allocated by the server.

\* \* \* \* \*